(12) United States Patent
Jain

(10) Patent No.: US 8,430,325 B2
(45) Date of Patent: *Apr. 30, 2013

(54) EXECUTING TRANSACTIONS SECURED USER CREDENTIALS

(75) Inventor: Deepak Jain, Garland, TX (US)

(73) Assignee: DeviceFidelity, Inc., Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/108,717

(22) Filed: May 16, 2011

(65) Prior Publication Data

US 2011/0215159 A1     Sep. 8, 2011

Related U.S. Application Data

(63) Continuation of application No. 12/206,564, filed on Sep. 8, 2008, now Pat. No. 7,942, 337.

(60) Provisional application No. 60/971,813, filed on Sep. 12, 2007.

(51) Int. Cl.
*G06K 19/06* (2006.01)

(52) U.S. Cl.
USPC ............................ 235/492; 235/380; 235/451

(58) Field of Classification Search .................. 235/375, 235/380, 451, 492, 449, 486
See application file for complete search history.

(56) References Cited

U.S. PATENT DOCUMENTS

| | | |
|---|---|---|
| 3,713,148 A | 1/1973 | Cardullo et al. |
| 4,614,861 A | 9/1986 | Pavlov et al. |
| 4,766,293 A | 8/1988 | Boston |
| 4,797,542 A | 1/1989 | Hara |
| 4,876,441 A | 10/1989 | Hara et al. |
| 5,140,517 A | 8/1992 | Nagata et al. |
| 5,180,902 A | 1/1993 | Schick et al. |
| 5,272,319 A | 12/1993 | Rey |
| 5,276,311 A | 1/1994 | Hennige |
| 5,434,398 A | 7/1995 | Goldberg |
| 5,528,222 A | 6/1996 | Moskowitz et al. |
| 5,729,607 A | 3/1998 | DeFries et al. |
| 5,748,737 A | 5/1998 | Daggar |
| 5,768,370 A | 6/1998 | Maatta et al. |

(Continued)

FOREIGN PATENT DOCUMENTS

| | | |
|---|---|---|
| CN | 1610918 | 4/2005 |
| DE | 103 17 394 A1 | 11/2004 |

(Continued)

OTHER PUBLICATIONS

Office Action issued in U.S. Appl. No. 12/209,087 on Nov. 4, 2009, 42 pages.

(Continued)

*Primary Examiner* — Tuyen K Vo
(74) *Attorney, Agent, or Firm* — Fish & Richardson P.C.

(57) ABSTRACT

In some implementations, a method includes interfacing a mobile device including a GUI. User credentials used to execute transactions with contactless devices are securely stored and associated with one or more enterprises. The secure memory includes master credentials and a master security framework that enables enterprises to store or update user credentials and associated security frameworks. Displays associated with the user credentials are dynamically generated and presented through the GUI of the mobile device. Wireless transactions are executed with contactless devices using the selectable user credentials.

25 Claims, 12 Drawing Sheets

U.S. PATENT DOCUMENTS

| | | | |
|---|---|---|---|
| 5,801,661 A | 9/1998 | Suzuki | |
| 5,834,747 A | 11/1998 | Cooper | |
| 6,029,892 A | 2/2000 | Miyake | |
| 6,032,859 A | 3/2000 | Muehlberger et al. | |
| 6,041,305 A | 3/2000 | Sakurai | |
| 6,045,043 A | 4/2000 | Bashan et al. | |
| 6,073,840 A | 6/2000 | Marion | |
| 6,073,856 A | 6/2000 | Takahashi | |
| 6,078,806 A | 6/2000 | Heinonen et al. | |
| 6,233,683 B1 | 5/2001 | Chan et al. | |
| 6,308,890 B1 | 10/2001 | Cooper | |
| 6,347,218 B1 | 2/2002 | Fuhrmann et al. | |
| 6,407,914 B1 | 6/2002 | Helot | |
| 6,418,326 B1 | 7/2002 | Heinonen et al. | |
| 6,484,259 B1 | 11/2002 | Barlow | |
| 6,533,178 B1 | 3/2003 | Gaul et al. | |
| 6,625,425 B1 | 9/2003 | Hughes et al. | |
| 6,634,564 B2 | 10/2003 | Kuramochi | |
| 6,764,005 B2 | 7/2004 | Cooper | |
| 6,771,981 B1 | 8/2004 | Zalewski et al. | |
| 6,829,711 B1 | 12/2004 | Kwok et al. | |
| 6,853,987 B1 | 2/2005 | Cook | |
| 6,891,811 B1 | 5/2005 | Smith et al. | |
| 6,920,338 B2 | 7/2005 | Engstrom et al. | |
| 6,961,587 B1 | 11/2005 | Vilppula et al. | |
| 6,970,130 B1 | 11/2005 | Walters et al. | |
| 7,012,572 B1 | 3/2006 | Schaffner et al. | |
| 7,079,832 B2 | 7/2006 | Zalewski et al. | |
| 7,083,094 B2 | 8/2006 | Cooper | |
| 7,113,139 B2 | 9/2006 | Charrat | |
| 7,128,274 B2 | 10/2006 | Kelley et al. | |
| 7,133,659 B2 | 11/2006 | Zalewski et al. | |
| 7,147,165 B2 | 12/2006 | Mongin et al. | |
| 7,155,199 B2 | 12/2006 | Zalewski et al. | |
| 7,183,505 B2 | 2/2007 | Mongin et al. | |
| 7,224,797 B2 | 5/2007 | Freeman et al. | |
| 7,228,155 B2 | 6/2007 | Saunders | |
| 7,232,061 B2 | 6/2007 | Furuyama et al. | |
| 7,286,818 B2 | 10/2007 | Roseberg | |
| 7,290,716 B2 | 11/2007 | Ito | |
| 7,305,260 B2 | 12/2007 | Vuoir et al. | |
| 7,334,732 B2 | 2/2008 | Cooper | |
| 7,343,184 B2 | 3/2008 | Rostami | |
| 7,364,092 B2 | 4/2008 | Narendra et al. | |
| 7,395,975 B2 | 7/2008 | Ito | |
| 7,407,094 B2 | 8/2008 | Myers et al. | |
| 7,494,068 B2 | 2/2009 | Patrice | |
| 7,509,487 B2 | 3/2009 | Lu et al. | |
| 7,530,495 B2 | 5/2009 | Cooper | |
| 7,537,169 B2 | 5/2009 | Gonzalez et al. | |
| 7,575,177 B2 | 8/2009 | Killian et al. | |
| 7,580,678 B2 | 8/2009 | Byman-Kivivuori et al. | |
| 7,581,678 B2 | 9/2009 | Narendra et al. | |
| 7,588,184 B2 | 9/2009 | Gandel et al. | |
| 7,599,857 B2 | 10/2009 | Biship et al. | |
| 7,601,031 B2 | 10/2009 | Tanaka et al. | |
| 7,604,176 B2 | 10/2009 | Bates et al. | |
| 7,606,560 B2 | 10/2009 | Labrou et al. | |
| 7,609,946 B2 | 10/2009 | Schedivy | |
| 7,623,832 B2 | 11/2009 | Watanabe et al. | |
| 7,657,255 B2 | 2/2010 | Abel et al. | |
| 7,707,113 B1 | 4/2010 | DiMartino et al. | |
| 7,719,613 B2 | 5/2010 | Kayanuma | |
| 7,748,031 B2 | 6/2010 | Gonzalez et al. | |
| 7,774,231 B2 | 8/2010 | Pond et al. | |
| 7,789,313 B2 | 9/2010 | Degauque et al. | |
| 7,805,615 B2 | 9/2010 | Narendra et al. | |
| 7,821,399 B2 | 10/2010 | Otranen | |
| 2001/0006902 A1 | 7/2001 | Ito | |
| 2001/0054087 A1 | 12/2001 | Flom et al. | |
| 2002/0017557 A1 | 2/2002 | Hendrick | |
| 2002/0023215 A1 | 2/2002 | Wang et al. | |
| 2002/0055368 A1 | 5/2002 | Lee | |
| 2002/0065902 A1 | 5/2002 | Janik et al. | |
| 2002/0128029 A1 | 9/2002 | Nishikawa et al. | |
| 2003/0052168 A1 | 3/2003 | Wong | |
| 2003/0064689 A1 | 4/2003 | Engstrom et al. | |
| 2003/0100338 A1 | 5/2003 | Lee | |
| 2003/0135463 A1 | 7/2003 | Brown et al. | |
| 2003/0145205 A1 | 7/2003 | Sarcanin | |
| 2003/0172028 A1 | 9/2003 | Abell et al. | |
| 2003/0186729 A1 | 10/2003 | Engstrom et al. | |
| 2003/0204845 A1 | 10/2003 | Sibley et al. | |
| 2003/0224831 A1 | 12/2003 | Engstrom et al. | |
| 2004/0064612 A1 | 4/2004 | Pinto et al. | |
| 2004/0070952 A1 | 4/2004 | Higuchi et al. | |
| 2004/0073519 A1* | 4/2004 | Fast | 705/65 |
| 2004/0083275 A1 | 4/2004 | Strisower | |
| 2004/0097256 A1 | 5/2004 | Kujawski | |
| 2004/0127256 A1 | 7/2004 | Goldwaite et al. | |
| 2004/0209648 A1 | 10/2004 | Chen | |
| 2004/0220964 A1 | 11/2004 | Shiftan et al. | |
| 2004/0238857 A1 | 12/2004 | Beroz et al. | |
| 2004/0256469 A1 | 12/2004 | Faenza et al. | |
| 2005/0022002 A1 | 1/2005 | Poisner | |
| 2005/0023359 A1 | 2/2005 | Saunders | |
| 2005/0027543 A1 | 2/2005 | Labrou et al. | |
| 2005/0055549 A1 | 3/2005 | Fischer | |
| 2005/0074123 A1 | 4/2005 | Cromer et al. | |
| 2005/0090280 A1 | 4/2005 | Nielsen | |
| 2005/0114780 A1 | 5/2005 | Turgeman | |
| 2005/0119936 A1 | 6/2005 | Buchanan et al. | |
| 2005/0182710 A1* | 8/2005 | Andersson et al. | 705/39 |
| 2005/0182926 A1 | 8/2005 | Akashika et al. | |
| 2005/0197169 A1 | 9/2005 | Son | |
| 2005/0212690 A1 | 9/2005 | Nishikawa | |
| 2005/0224589 A1 | 10/2005 | Park et al. | |
| 2005/0269401 A1 | 12/2005 | Spitzer et al. | |
| 2005/0269402 A1 | 12/2005 | Spitzer et al. | |
| 2006/0056397 A1 | 3/2006 | Aizu et al. | |
| 2006/0074698 A1 | 4/2006 | Bishop et al. | |
| 2006/0089123 A1 | 4/2006 | Frank | |
| 2006/0160560 A1 | 7/2006 | Josenhans et al. | |
| 2006/0186209 A1 | 8/2006 | Narendra et al. | |
| 2006/0219776 A1 | 10/2006 | Finn | |
| 2006/0226217 A1 | 10/2006 | Narendra et al. | |
| 2006/0287004 A1* | 12/2006 | Fuqua | 455/558 |
| 2006/0287964 A1 | 12/2006 | Brown | |
| 2006/0291483 A1 | 12/2006 | Sela | |
| 2007/0011724 A1 | 1/2007 | Gonzalez et al. | |
| 2007/0014407 A1 | 1/2007 | Narendra et al. | |
| 2007/0014408 A1 | 1/2007 | Narendra et al. | |
| 2007/0016798 A1 | 1/2007 | Narendra et al. | |
| 2007/0023532 A1 | 2/2007 | Narendra et al. | |
| 2007/0053306 A1 | 3/2007 | Stevens | |
| 2007/0057038 A1 | 3/2007 | Gannon | |
| 2007/0099592 A1 | 5/2007 | Thome et al. | |
| 2007/0113260 A1 | 5/2007 | Pua et al. | |
| 2007/0145135 A1 | 6/2007 | Jogand-Coulomb et al. | |
| 2007/0145152 A1 | 6/2007 | Jogand-Coulomb et al. | |
| 2007/0152035 A1 | 7/2007 | Adams et al. | |
| 2007/0155430 A1 | 7/2007 | Cheon et al. | |
| 2007/0156436 A1 | 7/2007 | Fisher et al. | |
| 2007/0156933 A1 | 7/2007 | Pinto et al. | |
| 2007/0170256 A1 | 7/2007 | Breitfuss | |
| 2007/0194105 A1 | 8/2007 | Kissick | |
| 2007/0206743 A1* | 9/2007 | Chang | 379/127.03 |
| 2007/0253251 A1 | 11/2007 | Mizushima et al. | |
| 2007/0254712 A1* | 11/2007 | Chitti | 455/558 |
| 2008/0003882 A1 | 1/2008 | Ni et al. | |
| 2008/0010372 A1 | 1/2008 | Khedouri et al. | |
| 2008/0026752 A1 | 1/2008 | Flore et al. | |
| 2008/0051059 A1 | 2/2008 | Fisher | |
| 2008/0051122 A1 | 2/2008 | Fisher | |
| 2008/0052192 A1 | 2/2008 | Fisher | |
| 2008/0052233 A1 | 2/2008 | Fisher et al. | |
| 2008/0054079 A1 | 3/2008 | Mullen | |
| 2008/0077950 A1 | 3/2008 | Burke et al. | |
| 2008/0090527 A1 | 4/2008 | Atkinson et al. | |
| 2008/0092212 A1 | 4/2008 | Patel et al. | |
| 2008/0093467 A1 | 4/2008 | Narendra et al. | |
| 2008/0099559 A1 | 5/2008 | Lo et al. | |
| 2008/0144650 A1 | 6/2008 | Boch et al. | |
| 2008/0244208 A1 | 10/2008 | Narendra et al. | |
| 2008/0263363 A1 | 10/2008 | Jueneman et al. | |
| 2008/0263680 A1 | 10/2008 | Bertin | |
| 2008/0277484 A1 | 11/2008 | Launay et al. | |

| | | | |
|---|---|---|---|
| 2008/0279381 A1 | 11/2008 | Narendra et al. | |
| 2008/0290160 A1 | 11/2008 | Huot et al. | |
| 2008/0305772 A1 | 12/2008 | Balasubramanian et al. | |
| 2008/0308641 A1 | 12/2008 | Finn | |
| 2009/0002167 A1 | 1/2009 | Mosteller | |
| 2009/0006722 A1 | 1/2009 | McAvoy et al. | |
| 2009/0015198 A1 | 1/2009 | Brandenburg | |
| 2009/0024533 A1 | 1/2009 | Fernandes et al. | |
| 2009/0040116 A1 | 2/2009 | Eray | |
| 2009/0064045 A1 | 3/2009 | Tremblay | |
| 2009/0065571 A1 | 3/2009 | Jain | |
| 2009/0065572 A1 | 3/2009 | Jain | |
| 2009/0068982 A1 | 3/2009 | Chen et al. | |
| 2009/0098825 A1 | 4/2009 | Huomo et al. | |
| 2009/0103732 A1 | 4/2009 | Benteo et al. | |
| 2009/0108063 A1 | 4/2009 | Jain et al. | |
| 2009/0115571 A1 | 5/2009 | Bishop et al. | |
| 2009/0127345 A1 | 5/2009 | Chamley et al. | |
| 2009/0137152 A1 | 5/2009 | Tanaka et al. | |
| 2009/0137204 A1 | 5/2009 | Chang | |
| 2009/0143104 A1 | 6/2009 | Loh et al. | |
| 2009/0152361 A1 | 6/2009 | Narendra et al. | |
| 2009/0169013 A1 | 7/2009 | Fascenda et al. | |
| 2009/0177530 A1 | 7/2009 | King et al. | |
| 2009/0181735 A1 | 7/2009 | Griffin et al. | |
| 2009/0192935 A1 | 7/2009 | Griffin et al. | |
| 2009/0193500 A1 | 7/2009 | Griffin et al. | |
| 2009/0210569 A1 | 8/2009 | Lusetti et al. | |
| 2009/0216681 A1 | 8/2009 | McCown | |
| 2009/0224888 A1 | 9/2009 | Caruana | |
| 2009/0234760 A1 | 9/2009 | Walter | |
| 2009/0235037 A1 | 9/2009 | Mounier et al. | |
| 2009/0298540 A1 | 12/2009 | Narendra et al. | |
| 2010/0022273 A1 | 1/2010 | Patrice | |
| 2010/0107230 A1 | 4/2010 | Tyagi et al. | |
| 2010/0114773 A1 | 5/2010 | Skowronek | |
| 2010/0136913 A1 | 6/2010 | Picquenot et al. | |
| 2010/0162377 A1* | 6/2010 | Gonzalez et al. | 726/9 |
| 2010/0203870 A1 | 8/2010 | Hubinak et al. | |
| 2010/0205373 A1 | 8/2010 | He et al. | |
| 2010/0213265 A1 | 8/2010 | Narendra et al. | |
| 2010/0258639 A1 | 10/2010 | Florek et al. | |
| 2010/0262840 A1 | 10/2010 | Benteo et al. | |
| 2010/0264211 A1 | 10/2010 | Jain et al. | |
| 2010/0274712 A1 | 10/2010 | Mestre et al. | |
| 2011/0145049 A1 | 6/2011 | Hertel et al. | |

FOREIGN PATENT DOCUMENTS

| | | |
|---|---|---|
| DE | 20 2006 001 690 | 4/2006 |
| EP | 1 111 557 A2 | 6/2001 |
| EP | 1 306 760 A1 | 5/2003 |
| EP | 1 626 349 A1 | 2/2006 |
| EP | 1 770 601 A1 | 4/2007 |
| EP | 1 773 059 A1 | 4/2007 |
| EP | 1 933 259 A1 | 6/2008 |
| JP | 4083447 | 3/1992 |
| WO | 91/12698 | 8/1991 |
| WO | WO 99/34314 A1 | 7/1999 |
| WO | WO 00/28490 A1 | 5/2000 |
| WO | WO 01/22695 A1 | 3/2001 |
| WO | WO 01/48688 A1 | 7/2001 |
| WO | 02/11074 | 2/2002 |
| WO | WO 2005/119607 A1 | 12/2005 |
| WO | WO 2005/119608 A1 | 12/2005 |
| WO | WO 2006/086232 A2 | 8/2006 |
| WO | WO 2006/091709 A2 | 8/2006 |
| WO | WO 2006/108184 A1 | 10/2006 |
| WO | WO 2007/011937 A2 | 1/2007 |
| WO | WO 2007/011990 A2 | 1/2007 |
| WO | WO 2007/011991 A2 | 1/2007 |
| WO | WO 2007/011992 A1 | 1/2007 |
| WO | 2007/052151 | 5/2007 |
| WO | WO 2007/088898 A1 | 8/2007 |
| WO | WO 2007/125223 A2 | 11/2007 |

OTHER PUBLICATIONS

International preliminary Report on Patentability issued in International Application No. PCT/US2008/076310, filed Sep. 12, 2008, mailed Sep. 11, 2009; 12 pages.

International Preliminary Report on Patentability issued in international Application No. PCT/US2008/075977, filed Sep. 11, 2008, mailed Dec. 30, 2009, 6 pages.

International Preliminary Report on Patentability issued in international Application No. PCT/US2008/076006, filed Sep. 11, 2008, mailed Dec. 29, 2009, 11 pages.

International Preliminary Report on Patentability issued in international Application No. PCT/US2008/076033, filed Sep. 11, 2008, mailed Dec. 29, 2009, 7 pages.

International Preliminary Report on Patentability issued in international Application No. PCT/US2008/076275, filed Sep. 12, 2008, mailed Dec. 10, 2009, 14 pages.

International Preliminary Report on Patentability issued in international Application No. PCT/US2008/076318, filed Sep. 12, 2008, mailed Sep. 11, 2009, 12 pages.

International Preliminary Report on Patentability issued in international Application No. PCT/US2008/076158, filed Sep. 12, 2008, mailed Dec. 29, 2009, 13 pages.

International Preliminary Report on Patentability issued in international Application No. PCT/US2008/076316, filed Sep. 12, 2008, mailed Nov. 27, 2009, 19 pages.

International Preliminary Report on Patentability issued in international Application No. PCT/US2008/076319, filed Sep. 12, 2008, mailed Dec. 16, 2009, 12 pages.

International Preliminary Report on Patentability issued in International Application No. PCT/US2008/076046, Mar. 16, 2010, 8 pages.

International Preliminary Report on Patentability issued in International Application No. PCT/US2008/076046 on May 21, 2010; 13 pages.

International Search Report and the Written Opinion of the International Searching Authority issued in International Application No. PCT/US2009/061018 Mar. 1, 2010, 14 pages.

International Search Report and the Written Opinion of the International Searching Authority issued in International Application No. PCT/US2009/061032, Mar. 3, 2010, 14 pages.

International Search Report and Written Opinion issued in International Application No. PCT/US2008/076307 on May 26, 2009, 15 pages.

International Search Report and Written Opinion of the International Searching Authority issued in international Application No. PCT/US2008/076046, filed Sep. 11, 2008, mailed Jan. 8, 2010, 14 pages.

Notification of Transmittal of the International Search Report and the Written Opinion of the International Searching Authority for appl. No. PCT/US2008/075977 filed Sep. 11, 2008, mailed Dec. 29, 2008 (12 pages).

Notification of Transmittal of the International Search Report and the Written Opinion of the International Searching Authority for appl. No. PCT/US2008/076006 filed Sep. 11, 2008, mailed Dec. 16, 2008 (13 pages).

Notification of Transmittal of the International Search Report and the Written Opinion of the International Searching Authority for appl. No. PCT/US2008/076033 filed Sep. 11, 2008, mailed Jan. 5, 2009 (12 pages).

Notification of Transmittal of the International Search Report and the Written Opinion of the International Searching Authority for appl. No. PCT/US2008/076318 filed Sep. 12, 2008, mailed Feb. 2, 2009 (14 pages).

Notification of Transmittal of the International Search Report and the Written Opinion of the International Searching Authority for appl. No. PCT/US2008/076158 filed Sep. 12, 2008, mailed Dec. 11, 2008 (14 pages).

Notification of Transmittal of the International Search Report and the Written Opinion of the International Searching Authority for appl. No. PCT/US2008/076316 filed Sep. 12, 2008, mailed Jan. 13, 2009 (14 pages).

Notification of Transmittal of the International Search Report and the Written Opinion of the International Searching Authority for appl. No. PCT/US2008/076319 filed Sep. 12, 2008, mailed Jan. 14, 2009 (15 pages).

Notification of Transmittal of the International Search Report and the Written Opinion of the International Searching Authority, or the Declaration issued in PCT/US2008/076275 on Apr. 16, 2009, 15 pages.

Office Action issued in U.S. Appl. No. 12/209,087 on Jul. 7, 2010; 36 pages.
Rankl, W., and Effing, W., *Smart Card Handbook*, Second Edition, John Wiley & Sons, Ltd., Sep. 18, 2000, 32 pages.
U.S. Appl. No. 12/205,796 entitled Wirelessly Executing Financial Transactions, Inventor Jain, filed Sep. 5, 2009.
U.S. Appl. No. 12/205,807 entitled Interfacign Tranaction Cards With Host Devices, Inventor Jain, filed Sep. 5, 2008.
U.S. Appl. No. 12/205,814 entitled Presenting Web Pages Through Mobile Host Devices, Inventor Jain, filed Sep. 5, 2009.
U.S. Appl. No. 12/205,821, entitled Selectively Switching Antennas of Transaction Cards, Inventor Jain, filed Sep. 5, 2008.
U.S. Appl. No. 12/209,087, entitled Wirelessly Executing Financial Transactions, Inventor Jain, filed Sep. 11, 2008.
U.S. Appl. No. 12/209,810, entitled Updating Mobile Devices With Additional Elements, Inventors Jain et al., filed Sep. 12, 2008.
U.S. Appl. No. 12/209,950, entitled Wirelessly Accessing Broadband Services Using Intelligent Cards, Inventor Jain, filed Sep. 12, 2009.
U.S. Appl. No. 12/210,161, entitled Wirelessly Accessing Broadband Services Using Intelligent Covers, Inventors Jain et al., filed Sep. 12, 2008.
U.S. Appl. No. 12/210,167, entitled Wirelessly Receiving Broadcast Signals Using Intelligent Cards, Inventor Jain, filed Sep. 12, 2009.
U.S. Appl. No. 12/210,176, entitled Receiving Broadcast Signals Using Intelligent Covers for Mobile Devices, Inventors Jain et al., filed Sep. 12, 2008.
U.S. Appl. No. 12/272,527, entitled Wirelessly Communicating Radio Frequency Signals, Inventors Jain et al., Filed Nov. 17, 2008.
U.S. Appl. No. 12/568,592, entitled Switching Between Internal and External Antennas, Inventor Jain, filed Sep. 28, 2008.
U.S. Appl. No. 12/571,163, entitled Amplifying Radio Frequency Signals, Inventor Jain, filed Sep. 30, 2008.
U.S. Appl. No. 12/678,047 entitled "Wirelessly Accessing Broadband Services Using Intelligent Covers", inventors Jain et al., filed Mar. 12, 2010.
U.S. Appl. No. 12/678,052 entitled "Updating Mobile Devices with Additional Elements", inventors Jain et al., filed Mar. 12, 2010.
U.S. Appl. No. 12/678,085 entitled "Receiving Broadcast Signals Using Intelligent Covers for Mobile Devices", inventors Jain et al., filed Mar. 12, 2010.
Uren P: "*Internet Smartcard Benefits for Internet Security Issues*" Campus-Wide Information Systems, Emerald Group Publishing Ltd., Bradford, GB, vol. 20, No. 3, Jan. 1, 2003, pp. 105-114 (XP008078638).
Onelook Dictionary Search; Definitions of firmware; Jul. 5, 2011; 2 pages.
U.S. Appl. No. 60/222,475 entitled "Electronic Device Cover With Embedded Radio Frequency (RF) Transponder and Methods of Using Same", inventor Zalewski, filed on Aug. 2, 2000; 46 pages.
Office Action issued in U.S. Appl. No. 12/205,796 on Dec. 1, 2011; 13 pages.
Office Action issued in U.S. Appl. No. 12/205,807 on Feb. 23, 2011; 15 pages.
Office Action issued in U.S. Appl. No. 12/205,807 on Jul. 14, 2011; 16 pages.
Advisory Action issued in U.S. Appl. No. 12/205,807 on Sep. 26, 2011; 3 pages.
Office Action issued in U.S. Appl. No. 12/205,814 on Sep. 15, 2011; 20 pages.
Office Action issued in U.S. Appl. No. 12/205,821 on Oct. 13, 2010; 15 pages.
Office Action issued in U.S. Appl. No. 12/205,821 on Apr. 1, 2011; 15 pages.
Office Action issued in U.S. Appl. No. 12/205,821 on Jun. 15, 2011; 15 pages.
Notice of Allowance issued in U.S. Appl. No. 12/205,821 on Dec. 19, 2011; 11 pages.
Office Action issued in U.S. Appl. No. 12/206,564 on Nov. 23, 2010; 15 pages.
Notice of Allowance issued in U.S. Appl. No. 12/206,564 on Mar. 30, 2011; 8 pages.
Notice of Allowance issued in U.S. Appl. No. 12/209,810 on Feb. 2, 2011; 8 pages.
Office Action issued in U.S. Appl. No. 12/210,167 on Dec. 16, 2011; 15 pages.
Office Action issued in U.S. Appl. No. 12/210,161 on Sep. 2, 2011; 10 pages.
Office Action issued in U.S. Appl. No. 12/210,161 on Dec. 20, 2011; 14 pages.
Office Action issued in U.S. Appl. No. 12/210,176 on Nov. 2, 2011; 21 pages.
Office Action issued in U.S. Appl. No. 12/272,527 on Mar. 16, 2011; 8 pages.
Office Action issued in U.S. Appl. No. 12/272,527 on Sep. 9, 2011; 8 pages.
Office Action issued in U.S. Appl. No. 12/568,592 on Jun. 27, 2011; 11 pages.
Notice of Allowance issued in U.S. Appl. No. 12/568,592 on Sep. 30, 2011; 7 pages.
Office Action issued in U.S. Appl. No. 12/571,163 on Jun. 16, 2011; 10 pages.
Office Action issued in U.S. Appl. No. 12/571,163 on Nov. 9, 2011; 9 pages.
International Preliminary Report on Patentability issued in International Application No. PCT/US2009/061018 on Sep. 26, 2011; 6 pages.
International Search Report and Written Opinion of the International Searching Authority issued in International Application No. PCT/US2011/035548 on Dec. 14, 2011; 8 pages.
Office Action issued in Chinese Application No. 200880107195.2 on Sep. 7, 2011; 7 pages.
Office Action issued in Chinese Application No. 200880107013.1 on Sep. 28, 2011; 5 pages.
Communication Pursuant to Article 94(3) EPC issued in European Application No. 08830698.0 on Nov. 29, 2010; 5 pages.
Communication Pursuant to Article 94(3) EPC issued in EP Application No. 08 830 698.0, dated Sep. 12, 2011, 4 pages.
Communication under Rule 71(3) issued in European Application No. 08830004.1 on Dec. 22, 2010; 70 pages.
Communication Pursuant to Article 94(3) EPC issued in European Application No. 08830136.1 on Nov. 29, 2010; 3 pages.
Office Action issued in Mexican Application No. MX/a/2010/002838 on Oct. 28, 2011; 2 pages.
Office Action issued in Mexican Application No. MX/a/2010/002833 on Jul. 14, 2011; 2 pages.
Office Action issued in U.S. Appl. No. 12/205,814 on Feb. 28, 2012; 23 pages.
Office Action issued in U.S. Appl. No. 13/367,022 on Mar. 13, 2012; 15 pages.
Notice of Allowance issued in U.S. Appl. No. 13/074,744 on Dec. 14, 2011; 10 pages.
Office Action issued in U.S. Appl. No. 12/209,950 on Jan. 12, 2012; 30 pages.
Notice of Allowance issued in U.S. Appl. No. 12/210,161 on Mar. 2, 2012; 10 pages.
Office Action issued in U.S. Appl. No. 12/210,176 on Apr. 5, 2012; 19 pages.
International Preliminary Report on Patentability issued in International Application No. PCT/US2009/061032 on Jan. 18, 2012; 17 pages.
Herzberg, Amir "Payments and Banking with Mobile Personal Devices", Communications of the ACM, May 2003; vol. 46, No. 5; pp. 53-58.
Notice of Allowance issued in U.S. Appl. No. 12/205,796 on Jul. 2, 2012; 10 pages.
Office Action issued in U.S. Appl. No. 12/205,807 on Jun. 7, 2012; 14 pages.
Office Action issued in U.S. Appl. No. 12/209,950 on Jun. 21, 2012; 34 pages.
Office Action issued in U.S. Appl. No. 12/210,167 on Jul. 19, 2012; 15 pages.
Office Action issued in U.S. Appl. No. 13/481,690 on Jun. 26, 2012; 31 pages.
Office Action issued in U.S. Appl. No. 13/302,766 on May 29, 2012; 9 pages.

Examination report issued in Australian Application No. 2008298677 on Jun. 6, 2012; 2 pages.
Office Action issued in Chinese Application No. 200880107195.2 on May 29, 2012; 10 pages.

Office Action issued in Chinese Application No. 200880107187.8 on Apr. 28, 2012; 10 pages.

* cited by examiner

US 8,430,325 B2

EXECUTING TRANSACTIONS SECURED USER CREDENTIALS

CLAIM OF PRIORITY

This application is a continuation application of and claims priority to U.S. patent application Ser. No. 12/206,564, filed on Sep. 8, 2008, which claims priority under 35 USC §119(e) to U.S. Patent Application Ser. No. 60/971,813, filed on Sep. 12, 2007, the entire contents of these applications are hereby incorporated by reference.

TECHNICAL FIELD

This invention relates to network communications and, more particularly, to executing transactions using secured user credentials.

BACKGROUND

Portable electronic devices and tokens have become an integrated part of the regular day to day user experience. There is a wide variety of common portable and handheld devices that users have in their possession including communication, business and entertaining devices such as cell phones, music players, digital cameras, smart cards, memory token and variety of possible combinations of the aforementioned devices and tokens. All of these devices share the commonality that consumer are accustomed to carrying them with them most of the time and to most places. This is true across the various demographics and age groups regardless of the level of the sophistication of the consumer, their age group, their technical level or background.

These common handheld devices offer options for expandable memory. Micro Secure Digital (microSD) is the popular interface across high-end cellphones while SD and MultiMediaCard (MMC) interfaces are also available in limited models. MicroSD is the least common denominator supported by the majority of these devices and tokens (in terms of size). In addition, adaptors are available to convert a MicroSD into MiniSD, SD, MMC and USB Although most popular MP3 player (iPOD) offer's a proprietary interface, competing designs do offer standard interfaces. Digital cameras offer mostly SD and MMC while extreme Digital (xD) is another option. Micro and Mini versions of these interfaces are also available in several models. Mini-USB is increasingly available across cellphones, digital cameras and MP3 players for synchronization with laptops.

SUMMARY

In some implementations, a method includes interfacing a mobile device including a GUI. User credentials used to execute transactions with contactless devices are securely stored and associated with one or more enterprises. The secure memory includes master credentials and a master security framework that enables enterprises to store or update user credentials and associated security frameworks. Displays associated with the user credentials are dynamically generated and presented through the GUI of the mobile device. Wireless transactions are executed with contactless devices using the selectable user credentials.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
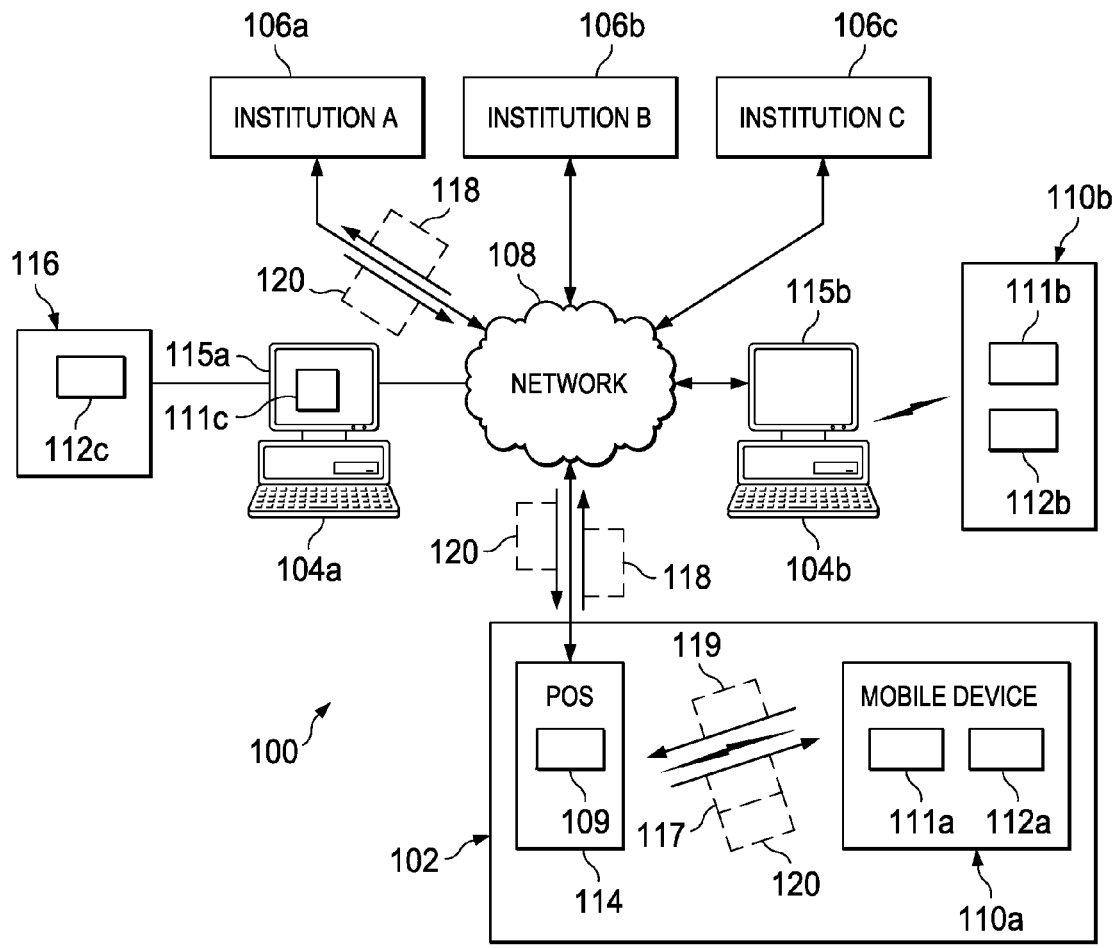
FIG. 1 is an example transaction system in accordance with some implementations of the present disclosure.

FIG. 1 is a block diagram illustrating an example transaction system 100 for wirelessly executing transactions with different enterprises using a single intelligent card. For example, the system 100 may include a single micoSecureDigital (microSD) card that executes transactions with different enterprises (e.g., financial institutions) independent of a mobile host device. For example, a single microSD card may execute a payment transaction with a financial institution, an access control transaction with a enterprise network, a ticket purchase transaction with a transit authority and/or an identity validation transaction with a government agency. In such implementations, each of the transactions can securely identify a user and user privileges with respect to the services being received from the different enterprises. Aside from microSD, the system 100 may include other mass storage interfaces that connect an intelligent card to a host device such as, for example, MultiMediaCard (MMC), SD, Universal Serial Bus (USB), Firewire, and/or others. A host device may include a cellphone, a smartphone, a Personal Digital Assistant (PDA), a MPEG-1 Audio Layer 3 (MP3) device, a digital camera, a camcorder, a client, a computer, and/or other device that includes, for example, a mass memory interface. In some implementations, an intelligent card can be a card that inserts into a host device and executes transactions independent of the host device. In executing transactions, the intelligent card may use a dual interface that connects to both the host device through a physical interface (e.g., SD, MMC, USB) and external devices through a wireless connection (e.g., NFC, ISO 14443, Bluetooth). The intelligent card may control or otherwise operate one or more hardware components of the mobile host device (e.g., display, cellular radio technology) using the physical interface and wirelessly communicate with access terminals using the wireless interface. In some implementations, the intelligent card includes a plurality of user credentials with each identity set associated with a different institution. For example, the intelligent card may store user credentials for a credit card, a debit card, a prepaid card, a gift card, a checking account, and/or other user accounts. In addition, the intelligent card may also store user credentials for other applications such as loyalty (points for purchase), airline (access to clubs, check-in), state (driving license), memberships (clubs) and/or others where user credentials are used to identify user so that goods and/or services can be provided. By storing multiple user credentials in a single intelligent card, the system 100 may execute transactions with different institutions without requiring multiple instruments. In other words, a single intelligent card may operate as a logical wallet that locally stores information for different user accounts and switches between the different user accounts in response to at least an event. By providing an intelligent card, the system 100 may wirelessly execute transactions with institutions without either requiring additional hardware, software, and/or firmware and/or without requiring changes to existing hardware, software, and/or firmware for reader terminals to enable a user to wirelessly execute a transaction. In addition, the system 100 may eliminate, minimize or otherwise reduce the number of instruments possessed by an individual to execute transactions using different user accounts. In other words, the intelligent card may operate as a plurality of different instruments but implemented as a single device.

At a high level, the system 100 includes an enterprise 102 and clients 104*a* and 104*b* coupled to institutions 106 through a network 108. While not illustrated, the system 100 may included several intermediary parties between the institution 106 and the network such as, for example, a transaction acquirer and/or a payment network host. The enterprise 102 includes a mobile device 110*a* having a transaction card 112*a* and an access point 114 that executes transactions with customers. The access point 114 includes a Graphical User Interface (GUI) 109 for presenting information to and/or receiving information from users. In some implementations, the access point 114 can wirelessly transmit a request to execute a transaction to the transaction card 112. The transaction card 112 may transmit authentication information to the access point 114. The client 104 includes the GUI 115 for presenting information associated with the system 100. The client 104*a* includes a card reader 116 that interfaces the transaction card 112*c* with the client 104*a*. The institution 106 may authorize the transaction based, at least in part, on information transmitted by the transaction card 112. The mobile device 110 includes a GUI 111 for presenting information associated with user transactions.

The enterprise 102 is generally at least a portion of an enterprise having a physical presence (e.g., building) for operations. For example, the enterprise 102 may sell goods and/or services at a physical location (e.g., a brick-and-mortar store) directly to customers. In this example, the enterprise 102 buys or otherwise receives goods (e.g., produce) from distributors (not illustrated) and then may sell these goods to customers, such as users of the mobile device 110. In general, the enterprise 102 may offer face-to-face experiences with customers in providing goods and/or services. For example, the enterprise 102 may be a click-and-mortar store such that a user selects a good or service using the Internet and purchases and receives the good or service at the enterprise 102. The enterprise 102 may provide one or more of the following services associated with goods: inventory, warehousing, distribution, and/or transportation. As a result, the enterprise 102 may not immediately distribute goods received from distributors. The enterprise 102 may include a single retail facility, one or more retail facilities at a single geographic location, and/or a plurality of retail facilities geographically distributed. In some cases, two or more entities may represent portions of the same legal entity or affiliates. For example, the enterprise 102 and distributors may be departments within one enterprise. In summary, the enterprise 102 may wirelessly execute financial transactions with the mobile device 110.

Each mobile device 110 comprises an electronic device operable to interface with the transaction card 112*a*. For example, the mobile device 110 may receive and transmit wireless and/or contactless communication with the system 100. As used in this disclosure, the mobile devices 110 are intended to encompass cellular phones, data phones, pagers, portable computers, SIP phones, smart phones, personal data assistants (PDAs), digital cameras, MP3 players, camcorders, one or more processors within these or other devices, or any other suitable processing devices capable of communicating information with the transaction card 112. In some implementations, the mobile devices 110 may be based on a cellular radio technology. For example, the mobile device 110 may be a PDA operable to wirelessly connect with an external or unsecured network. In another example, the mobile device 110 may comprise a laptop that includes an input device, such as a keypad, touch screen, mouse, or other device that can accept information, and an output device that conveys information associated with a transaction with the enterprise 102, including digital data, visual information, or GUI 111.

The GUI 111 comprises a graphical user interface operable to allow the user of the mobile device 110 to interface with at least a portion of the system 100 for any suitable purpose, such as executing transactions and/or and presenting transaction history. Generally, the GUI 111 provides the particular user with an efficient and user-friendly presentation of data provided by or communicated within the system 100 and/or also an efficient and user-friendly means for the user to self-manage settings and access services offered by the institution 106. The GUI 111 may comprise a plurality of customizable frames or views having interactive fields, pull-down lists, and/or buttons operated by the user. The term graphical user interface may be used in the singular or in the plural to describe one or more graphical user interfaces and each of the displays of a particular graphical user interface. The GUI 111 can include any graphical user interface, such as a generic web browser or touch screen, that processes information in the system 100 and presents the results to the user.

The transaction card 112 can include any software, hardware, and/or firmware configured to wirelessly execute transactions with the access point 114 using one of a plurality of selectable user accounts. For example, the transaction card 112 may select user credentials associated with one of the plurality of selectable user accounts (e.g., financial accounts) and execute a contactless transaction with the access point 114 using the selected account and independent of the mobile device 110*a*. In other words, the transaction card 112 may wirelessly execute transactions without aspects of the transaction being executed by the mobile device 110. In addition, the transaction card 112 may locally-store user credentials and/or applications (e.g., payment applications, access applications) for a plurality of selectable user accounts. The transaction card 112 may dynamically switch between user credentials and payment applications in response to at least an event. A switching event may include a selection from a user through the GUI 111, completion of a transaction, detection of a type of signal, determining a type of purchase (e.g., groceries, clothes), change in geographic area (e.g., GPS), and/or other events. The different user accounts may include a credit card account (e.g., Visa, MasterCard), a retail account (e.g., Target, Dillard's), a prepaid card, a gift card, a bank card (e.g., Bank of America), an airline card, an identity card, a driving license, and/or others. In some implementations, the transaction card 112 may include user credentials for any combination of financial, retail, airline, corporate, state and/or other accounts. In some implementations, the transaction card 112 may locally-store applications for the plurality of selectable user accounts. For example, the transaction card 112 may execute a different application for each of the different user credentials. The different applications may execute transactions using different reader infrastructures, formats, protocols, encryption, type/structure of user credentials exchanged with the terminal, and/or other aspects.

The transaction card 112 may execute transactions with the access point 114 using short range signals such as NFC (e.g., ISO 18092/ECMA 340), ISO 14443, ISO 15693, Felica, MiFARE, Bluetooth, Ultra-wideband (UWB), Radio Frequency Identifier (RFID), and/or other signals compatible with retail payment terminals (e.g., access point 114). In some implementations, the transaction card 112 may include one or more chipsets that execute an operating system and security processes to independently execute the transaction. In doing so, the mobile device 110 does not require additional hardware, software, and/or firmware to wirelessly execution a transaction with the A access point 114 such as an NFC transaction. In some implementations, the transaction card 112 may execute one or more of the following: dynamically switch between user credentials and/or applications in response to at least one or more events; wirelessly receive a request from the access point 114 to execute a transaction and/or transmit a response; translate between wireless protocols and protocols compatible with the transaction card 112; translate between transaction-card protocols and protocols compatible with mobile device 110; present and receive information (e.g., PIN request, PIN) from the user through the GUI 111; decrypt and encrypt information wirelessly transmitted between the transaction card 112 and the access point 114; execute applications locally stored in the transaction card 112; selectively switch the antenna of the transaction card 112 on and off based, at least in part, on one or more events; execute authentication processes based, at least in part, on information received, for example, through the GUI 111; transmit a host signature to access point 114 in response to at least a transaction challenge; store, at least in part, details of the transaction executed between the card 112 and the access point 114; generate and/or present alerts (e.g., audio-visual alerts) to the user through the GUI 111; generate and/or transmit wireless-message alerts to the institution 106 using the mobile device 110 if cellular capable; and/or others. In some implementations, the transaction card 112 may initiate a transaction in response to at least a user selecting a graphical element in the GUI 111. The transaction card 112 may initiate a transaction with the access point 114 in response to at least wireless request transmitted by the access point 114. In some implementations, the transaction card 112 may selectively switch the antenna between an on and off state in response to one or more events. The one or more events may include a user request, completion of transaction, insertion of card 112 different mobile device, location change, timer events, detection of incorrect PIN entered by the user, change of wireless network that the device is connected to, message received from the institution 106 using wireless communication methods such as SMS, and/or other events. For example, the transaction card 112 may receive one or more commands to switch the antenna off from a cellular network (not illustrated) through the mobile device 110.

In regards to translating between protocols, the transaction card 112 may process information in, for example, ISO 7816, a standard security protocol, and/or others. In this case, the transaction card 112 may translate between an NFC protocol (e.g., ISO 18092) and the transaction-card protocol. In addition, the transaction card 112 may interface the mobile device 110 through a physical interface such as MicroSD, Mini-SD or SD. In regard to security processes, the transaction card 112 may implement one or more encryption algorithms to secure transaction information such as card number (e.g., credit card number, debit-card number, bank account number), PIN, and/or other security related information. The security related information may include an expiry date, card verification code, user name, home phone number, user zip code and/or other user information associated with verifying an identity of the card holder. In some implementations, the transaction card 112 may execute private key (symmetric algorithms) such as DES, TDES and/or others or public key (asymmetric algorithms) such as RSA, elliptic curves, and/or others. In addition, the transaction card 112 may include memory (e.g., Flash, EEPROM) for storing user data, applications, offline Webpages, and/or other information. In regards to applications, the transaction card 112 may execute a locally stored application and present information to and received information from the user through the GUI 111. For example, the transaction card 112 may execute an application used to synchronize an account balance with the institution 106 using the GUI 111 and the mobile device 110. Alternatively or in addition to applications, the transaction card 112 may present offline Web pages to the user using the GUI 111. In response to initiating a transaction, the transaction card 112 may automatically present an offline Web page through the GUI 111. In some implementations, the offline Web page can be associated with a institution 106. In some implementations, the transaction card 112 can be backward compatible and operate as a mass storage device. For example, if the wireless interface of the transaction card 112 is not available or deactivated, the transaction card 112 may operate as a mass storage device enabling users to access data stored in the memory component (e.g., Flash). In some implementations, the transaction card 112 can execute a set of initialization commands in response to at least insertion into the mobile device 110. These initialization commands may include determining device related information for the mobile device 100 (e.g., phone number, signature, connected network information, location information and other available properties), determining user relating information (e.g., PIN code, activation code), incrementing counters, setting flags and activating/deactivating functions according to pre-existing rules and/or algorithms.

In some implementations, the transaction card 112 may automatically execute one or more fraud control processes. For example, the transaction card 112 may identify an operational change and automatically transmit a notification to the financial institution based, at least in part, on the identified change. The transaction card 112 may execute two fraud control processes: (1) determine a violation of one or more rules; and (2) automatically execute one or more actions in response to at least the violation. In regards to rules, the transaction card 112 may locally store rules associated with updates to operational aspects of the transaction card 112. For example, the transaction card 112 may store a rule indicating a change in mobile host device 110 is an operational violation. In some implementations, the transaction card 112 may store rules based, at least in part, on updates to one or more of the following: phone number of host device 110; MAC address of host device 110; network wirelessly connected to host device 110; location of host device; and/or other aspects. In response to one or more events matching or otherwise violating rules, the transaction card 112 may execute one or more processes to substantially prevent or otherwise notify the institutions 106 of potentially fraudulent activity. For example, the transaction card 112 may execute a command to block an associated user account and/or the transaction card 112. Alternatively or in addition, the transaction card 112 may transmit a command to the institution 106 to call the mobile host device 110. In some implementations, the transaction card 112 may execute a command based, at least in part, on an event type. In some examples, the transaction card 112 may initiate a call with the institution 106 in response to at least a change in number of the host device 110. In some examples, the transaction card 112 may re-execute the activation process in response to at least a specified event type. In some implementations, the transaction card 112 may execute a command to disconnect the GUI 111 from the transaction card 112. The transaction card 112 may present a disconnection notification through the GUI 111 prior to executing the command. In some implementations, the transaction card 112 may transmit a command to the institution 106 to deactivate an account associated with the card 112.

In some implementations, the access point 114 may transmit a transaction request 117 to the transaction card 112 for information to generate an authorization request 118. In response to at least the transaction request, the transaction card 112 may transmit one or more transaction responses 119 identifying information associated with a user account. In some implementations, the access point 114 may transmit a request 118 to authorize a transaction to the institution 106. The authorization information may include an account number, a transaction amount, user credentials, and/or other information. In response to at least the transaction request 118, the institution 106 may transmit an authorization response 120 to the access point 114. In some implementations, the access point 114 may transmit the response 120 to the transaction card 112. The transaction response 120 may include, for example, a receipt presentable to the user through the GUI 111a. In some implementations, the institution 106 may transmit the authorization response 120 to the mobile device through a cellular core network (see FIG. 2). In this implementation, the institution 106 may have stored the association between the mobile device 110 and the transaction card 112 during the user sign-up process, automatically upon user activation of the card 112 when, for example, the card 112 is initially inserted into the mobile device 110, and/or other event. In the illustrated implementation, the access point 114 includes the GUI 109.

The GUI 109 comprises a graphical user interface operable to allow the user of the access point 114 to interface with at least a portion of the system 100 for any suitable purpose, such as a user entering transaction information (e.g., PIN, transaction acceptance) and/or and presenting transaction information (e.g., transaction amount). Generally, the GUI 109 provides the particular user with an efficient and user-friendly presentation of data provided by or communicated within the system 100 and/or also an efficient and user-friendly means for the user to initiate a wirelessly transaction with the transaction card 112. The GUI 109 may present a series of screens or displays to the user to, for example, accept a transaction and enter security information such as a PIN.

In some implementations, the transaction card 112 can be implemented differently. The transaction card 112 may be implemented as a KeyFOB and remains live outside the mobile device 110 as a FOB. In this case, the transaction card 112 may be passive and powered from an induction magnetic field generated by the access point 114. The transaction card 112 may be implemented in the form of an industrial integrated circuit chip for mounting on a PCB or IC chip. In some implementations, the transaction card 112 may be implemented in the form of a self contained desktop standalone unit powered by external AC adapter or stand alone box. In some implementations, the transaction card 112 can be implemented as an external attachment to a mobile device 110 (e.g., case) and connected to the mobile device using a peripheral interface such as USB, serial port, the iDock apple proprietary interface, and/or other interface.

In some implementations, the transaction card 112 may operate in accordance with one or more of the following modes: active card emulation; active reader; self train; killed; memory; and/or other modes. The transaction card 112 may operate active-card-emulation mode to convert the mobile device 110 to a contactless payment device loaded with a financial vehicle (FV) that may be, for example, a credit card, a debit card, a gift card and/or other retail payment product. In this mode, the transaction card 112 may execute transactions at any capable retail payment terminal (e.g., access point 114) that accepts contactless payment transactions. For example, such terminals may be contactless-enabled terminals currently being deployed by merchants under MasterCard's paypass or Visa's paywave programs. After the antenna of the transaction card 112 is activated in this mode, a merchant terminal may detect the presence of the transaction card 112 and prompt the user to authorize a transaction such as by entering a PIN, signing on a terminal interface, confirming the amount of the transaction, and/or other action. In this mode, such transactions may be handled as a normal credit card present transaction. In this implementation, neither the terminal nor the financial institution may require additional software to execute the transaction. In addition, the transaction card 112 in this mode may be used for other applications such as physical access control (to open gates either in a corporate environment or in a transit environment), logical access control (to request network access via a PC), application access control (to buy access for amenities such as transportation, movies or wherever payment needs to be made to gain access to a facility), and/or other applications.

In the active-reader mode, the transaction card 112 may convert the mobile device 110 to a contactless reader device capable of receiving data when in range of a transmitting terminal (e.g., access point 114). In some implementations, this mode can require special NFC hardware with reader mode capability as part of the transaction card 112. In the event that the mobile device 110 is proximate (e.g., 10 cm or less) a transmitting terminal, the reader mode of the transaction card 112 may activated and prompt the user for authorization to receive data through the GUI 111. This mode may only be suitable for mobile devices 110 with a UI element, such as an OK button and a screen, an LED to indicate that data reception is being requested, and/or other interfaces. Once the user authorizes the transmission, the transaction card 112 in this mode may receive, and locally store, process and may execute a transaction and/or forward received data to another entity. For example, the transaction card 112 in this mode may receive content through promotional posters, validating the purchase of a ticket, and/or others. For example, the transaction card 112 in this mode may function as a mobile POS terminal receiving transaction information from a plastic contactless card/FOB and instructing the mobile device 110 to prepare a transaction authorization request for the institution 106 through a cellular core network. Once the institution 106 authorizes the transaction, the mobile device 110 may display the confirmation of the transaction to the user through the GUI 111.

In regards to the self-train mode, the transaction card 112 may execute a version of the reader mode. In some implementations, the self-train mode can be activated by a special action (e.g., a needle point press to a small switch, entry of an administrative password via the GUI 111). In response to at least activating this mode, the transaction card 112 may be configured to receive personalization data over, for example, the short range wireless interface from another peer transaction card such as the plastic contactless cards compliant with this functionality and issued by the institution 106. Personalization data received in this mode may include encrypted FV information that is stored in secured memory of the transaction card 112. In some implementations, the transaction card 112 in this mode may receive the FV information through a contactless interface of a transmitter and/or others. The transaction card 112 may then synthesize the FV information that corresponds to the user account and personalize the secure element. The self-train mode may be used to re-personalize the plug-in in the field. In some implementations, all previous data can be deleted if the self-train mode is activated. The self-train mode may be a peer-to-peer personalization mode where the card 112 may receive personalization information from another transaction card 112. This mode may not include a factory, store and/or Over-The-Air (OTA) personalization scenarios which may be server to client personalization scenarios. In some implementations, the self-train mode may be a peer-to-peer personalization mode where the transaction card 112 receives personalization information from another transaction card. Since two transaction cards 112 are used in this mode, this mode is not a server to client personalization scenario as with a factory, store, and OTA personalization.

In regards to the killed mode, the transaction card 112 may permanently deactivate the contactless interface. In some implementations, the killed mode is activated through the physical interface with the mobile device 110 such as a microSD interface. In response to at least the activation of the killed mode, the transaction card 112 may permanently behaves as a mass memory stick. In the event that the reset needle point is pressed, the transaction card 112 may, in some implementations, not be made to enter any other modes. In addition, the transaction card 112 may delete financial content in memory in response to at least this mode being activated. In some implementations, wireless operators may use this mode to delete data from a transaction card 112 physically lost.

In regards to the memory mode, the transaction card 112 may operate as a mass memory stick such that the memory is accessible through conventional methods. In some implementations, the transaction card 112 may automatically activate this mode in response to at least being removed from the host device, inserted into a non-authorized host device, and/or other events. The transaction card 112 may be switched to active mode from the memory mode by, for example, inserting the card 112 into an authorized device or may be switched from this mode into the self-train mode to re-personalize the device for a new host device or a new user account.

In some implementations, the transaction card 112 may be re-personalized/updated such as using software device management process and/or a hardware reset. For example, the user may want to re-personalize the transaction card 112 to change host devices, to have multiple host devices, and/or other reasons. In regards to the software device management, the user may need to cradle the new host device with the transaction card 112 inserted to launch the software device management application. In some implementations, the software management application can be an application directly installed on the client 104, integrated as a plug-in to a normal synchronization application such as ActiveSync, available via a browser plug-in running on the plug-in provider's website, and/or other sources. The user may log into the application and verify their identity, and in response to verification, the application may allow access to a devices section in the device management application. The device management application may read the transaction card 112 and display the MAC addresses, signatures of the devices that he has inserted his plug-in to, and/or other device specific information. The mobile device 110 may be marked as active and the host device may be shown as disallowed or inactive. The application may enable the user to update the status of the new host device, and in response to at least the selection, the device management application may install the signature on the new host device and mark update the status as allowable in secure memory of the transaction card 112. The user may be able to also update the status of the mobile device 110 to disallowed. Otherwise, both devices may be active and the transaction card 112 may be switched between the two devices. In regards to the hardware reset process, the use may use the reset needle point press on the physical transaction card 112 to activate the self-train mode. In this mode, the financial data may be deleted and have to be reloaded. When the transaction card 112 is inserted into the new host device, the provisioning process may begin as discussed above.

The access point 114 can include any software, hardware, and/or firmware that wirelessly receive account information for executing a transaction with one or more institutions 106. For example, the access point 114 may be an electronic cash register capable of wirelessly transmitting transaction information with the transaction card 112a. The access point 114 may transmit information in one or more the following formats: 14443 Type A/B, Felica, MiFare, ISO 18092, ISO 15693; and/or others. The transaction information may include verification information, check number, routing number, account number, transaction amount, time, driver's license number, merchant ID, merchant parameters, credit-card number, debit-card number, digital signature and/or other information. In some implementations, the transaction information may be encrypted. In illustrated implementation, the access point 114 can wirelessly receive encrypted transaction information from the transaction card 112 and electronically send the information to one or more of the institutions 106 for authorization. For example, the access point 114 may receive an indication that a transaction amount has been accepted or declined for the identified account and/or request additional information from the transaction card 112.

As used in this disclosure, the client 104 are intended to encompass a personal computer, touch screen terminal, workstation, network computer, a desktop, kiosk, wireless data port, smart phone, PDA, one or more processors within these or other devices, or any other suitable processing or electronic device used for viewing transaction information associated with the transaction card 112. For example, the client 104 may be a PDA operable to wirelessly connect with an external or unsecured network. In another example, the client 104 may comprise a laptop that includes an input device, such as a keypad, touch screen, mouse, or other device that can accept information, and an output device that conveys information associated with transactions executed with the institutions 106, including digital data, visual information, or GUI 115. In some implementations, the client 104b can wirelessly communicate with the transaction card 112b using, for example, an NFC protocol. In some implementations, the client 104a includes a card reader 116 having a physical interface for communicating with the transaction card 112c. In some implementations, the card reader 116 may at least include an adapter 116b that adapts the interface supported by the client 104 (e.g., USB, Firewire, Bluetooth, WiFi) to the physical interface supported by the card 112 (e.g., SD/NFC). In this case, the client 104*a* may not include a transceiver for wireless communication.

The GUI 115 comprises a graphical user interface operable to allow the user of the client 104 to interface with at least a portion of the system 100 for any suitable purpose, such as viewing transaction information. Generally, the GUI 115 provides the particular user with an efficient and user-friendly presentation of data provided by or communicated within the system 100. The GUI 115 may comprise a plurality of customizable frames or views having interactive fields, pull-down lists, and/or buttons operated by the user. The term graphical user interface may be used in the singular or in the plural to describe one or more graphical user interfaces and each of the displays of a particular graphical user interface. The GUI 115 can include any graphical user interface, such as a generic web browser or touch screen, that processes information in the system 100 and presents the results to the user. The institutions 106 can accept data from the client 104 using, for example, the web browser (e.g., Microsoft Internet Explorer or Mozilla Firefox) and return the appropriate responses (e.g., HTML or XML) to the browser using the network 108. In some implementations, the GUI 111*c* of the transaction card 112*c* may be presented through the GUI 115*a* of the client 104*a*. In these implementations, the GUI 115*a* may retrieve user credentials from the GUI 111*c* and populate financial forms presented in the GUI 115*a*. For example, the GUI 115*a* may present a form to the user for entering credit card information to purchase a good through the Internet, and the GUI 115*a* may populate the form using the GUI 111*c* in response to at least a request from the user.

Institutions 106*a-c* can include any enterprise that may authorize transactions received through the network 108. For example, the institution 106*a* may be a credit card provider that determines whether to authorize a transaction based, at least in part, on information received through the network 106. The institution 106 may be a credit card provider, a bank, an association (e.g., VISA), a retail merchant (e.g., Target), a prepaid/gift card provider, an internet bank, a government entity, a club, and/or others. In general, the institution 106 may execute one or more of the following: receive a request to authorize a transaction; identify an account number and other transaction information (e.g., PIN); identify funds and/or a credit limit associated with the identified account; identify access privileges associated with the user account; determine whether the transaction request exceeds the funds and/or credit limit and/or violates any other rules associated with the account; transmit an indication whether the transaction has been accepted or declined; and/or other processes. In regards to banking, the institution 106 may identify an account number (e.g., bank account, debit-card number) and associated verification information (e.g., PIN, zip code) and determine funds available to the account holder. Based, at least in part, on the identified funds, the institution 106 may either accept or reject the requested transaction or request additional information. As for encryption, the institution 106 may use a public key algorithm such as RSA or elliptic curves and/or private key algorithms such as TDES to encrypt and decrypt data.

Network 108 facilitates wireless or wired communication between the financial institutions and any other local or remote computer, such as clients 104 and the access point 114. Network 108 may be all or a portion of an enterprise or secured network. While illustrated as single network, network 108 may be a continuous network logically divided into various sub-nets or virtual networks without departing from the scope of this disclosure, so long as at least a portion of network 108 may facilitate communications of transaction information between the institutions 106, the clients 104, and the enterprise 102. In some implementations, network 108 encompasses any internal or external network, networks, sub-network, or combination thereof operable to facilitate communications between various computing components in system 100. Network 108 may communicate, for example, Internet Protocol (IP) packets, Frame Relay frames, Asynchronous Transfer Mode (ATM) cells, voice, video, data, and other suitable information between network addresses. Network 108 may include one or more local area networks (LANs), radio access networks (RANs), metropolitan area networks (MANs), wide area networks (WANs), all or a portion of the global computer network known as the Internet, and/or any other communication system or systems at one or more locations.

Figure 2:
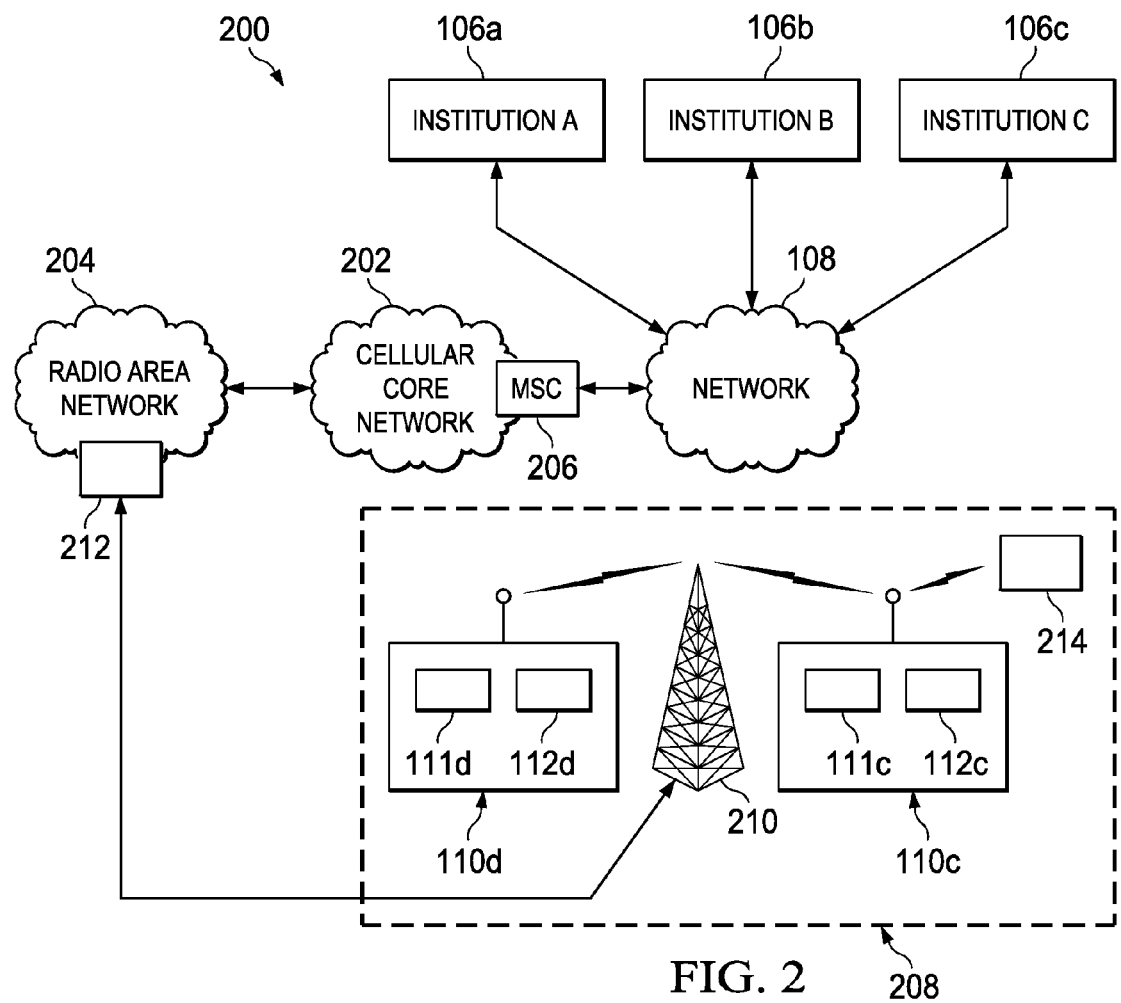
FIG. 2 is an example transactions system that transmits transaction information through a cellular core network.

FIG. 2 is a block diagram illustrating an example transaction system 200 for wirelessly communicating transactions information using cellular radio technology. For example, the system 200 may wirelessly communicate a transaction receipt to a transaction card 112 using a mobile host device 110 and cellular radio technology. In some implementations, cellular radio technology may include Global System for Mobile Communication (GSM), Code Division Multiple Access (CDMA), Universal Mobile Telecommunications System (UMTS), and/or any other cellular technology. The institutions 106 may assign one or more mobile host devices 110 to a transaction card 112 in response to one or more events. In some examples, the user may register the one or more mobile devices 110 with the institution 106 in connection with, for example, requesting the associated transaction card 112. In some examples, the transaction card 112 may register the mobile host device 110 with the institution 106 in response to at least an initial insertion into the device 110. Regardless of the association process, the system 100 may use the cellular capabilities of the host devices 110 to communicate information between the institutions 106 and the transaction card 112. In using the cellular radio technology of the host device 110, the system 200 may communicate with the transaction card 112 when the card 112 is not proximate a retail device, such as the Access point 114 of FIG. 1.

In the illustrated implementation, the cellular core network 202 typically includes various switching elements, gateways and service control functions for providing cellular services. The cellular core network 202 often provides these services via a number of cellular access networks (e.g., RAN) and also interfaces the cellular system with other communication systems such as the network 108 via a MSC 206. In accordance with the cellular standards, the cellular core network 202 may include a circuit switched (or voice switching) portion for processing voice calls and a packet switched (or data switching) portion for supporting data transfers such as, for example, e-mail messages and web browsing. The circuit switched portion includes MSC 206 that switches or connects telephone calls between radio access network (RAN) 204 and the network 108 or another network, between cellular core networks or others. In case the core network 202 is a GSM core network, the core network 202 can include a packet-switched portion, also known as General Packet Radio Service (GPRS), including a Serving GPRS Support Node (SGSN) (not illustrated), similar to MSC 206, for serving and tracking communication devices 102, and a Gateway GPRS Support Node (GGSN) (not illustrated) for establishing connections between packet-switched networks and communication devices 110. The SGSN may also contain subscriber data useful for establishing and handing over call connections. The cellular core network 202 may also include a home location register (HLR) for maintaining "permanent" subscriber data and a visitor location register (VLR) (and/or an SGSN) for "temporarily" maintaining subscriber data retrieved from the HLR and up-to-date information on the location of those communications devices 110 using a wireless communications method. In addition, the cellular core network 202 may include Authentication, Authorization, and Accounting (AAA) that performs the role of authenticating, authorizing, and accounting for devices 110 operable to access GSM core network 202. While the description of the core network 202 is described with respect to GSM networks, the core network 202 may include other cellular radio technologies such as UMTS, CDMA, and others without departing from the scope of this disclosure.

The RAN 204 provides a radio interface between mobile devices and the cellular core network 202 which may provide real-time voice, data, and multimedia services (e.g., a call) to mobile devices through a macrocell 208. In general, the RAN 204 communicates air frames via radio frequency (RF) links. In particular, the RAN 204 converts between air frames to physical link based messages for transmission through the cellular core network 202. The RAN 204 may implement, for example, one of the following wireless interface standards during transmission: Advanced Mobile Phone Service (AMPS), GSM standards, Code Division Multiple Access (CDMA), Time Division Multiple Access (TDMA), IS-54 (TDMA), General Packet Radio Service (GPRS), Enhanced Data Rates for Global Evolution (EDGE), or proprietary radio interfaces. Users may subscribe to the RAN 204, for example, to receive cellular telephone service, Global Positioning System (GPS) service, XM radio service, etc.

The RAN 204 may include Base Stations (BS) 210 connected to Base Station Controllers (BSC) 212. BS 210 receives and transmits air frames within a geographic region of RAN 204 (i.e. transmitted by a cellular device 102e) and communicates with other mobile devices 110 connected to the GSM core network 202. Each BSC 212 is associated with one or more BS 210 and controls the associated BS 210. For example, BSC 212 may provide functions such as handover, cell configuration data, control of RF power levels or any other suitable functions for managing radio resource and routing signals to and from BS 210. MSC 206 handles access to BSC 212 and the network 108. MSC 206 may be connected to BSC 212 through a standard interface such as the A-interface. While the elements of RAN 204 are describe with respect to GSM networks, the RAN 204 may include other cellular technologies such as UMTS, CDMA, and/or others. In the case of UMTS, the RAN 204 may include Node B and Radio Network Controllers (RNC).

The contactless smart card 214 is a pocket-sized card with embedded integrated circuits that process information. For example, the smart card 214 may wirelessly receive transaction information, process the information using embedded applications and wirelessly transmit a response. The contactless smart card 214 may wirelessly communicate with card readers through RFID induction technology at data rates of 106 to 848 kbit/s. The card 214 may wirelessly communicate with proximate readers between 10 cm (e.g., ISO/IEC 14443) to 50 cm (e.g., ISO 15693). The contactless smart card 214 operates independent of an internal power supply and captures energy from incident radio-frequency interrogation signals to power the embedded electronics. The smart card 214 may be a memory card or microprocessor card. In general, memory cards include only non-volatile memory storage components and may include some specific security logic. Microprocessor cards include volatile memory and microprocessor components. In some implementations, the smart card 214 can have dimensions of normally credit card size (e.g., 85.60×53.98×0.76 mm, 5×15×0.76 mm). In some implementations, the smart card 214 may be a fob or other security token. The smart card 214 may include a security system with tamper-resistant properties (e.g., a secure cryptoprocessor, secure file system, human-readable features) and/or may be configured to provide security services (e.g., confidentiality of stored information).

In some aspects of operation, the institution 106 may wirelessly communicate with the mobile host device 110 using the cellular core network 202. For example, the institution 106 may transmit information to the mobile host device 110 in response to at least an event. The information may include, for example, transaction information (e.g., transaction receipt, transaction history), scripts, applications, Web pages, and/or other information associated with the institutions 106. The event may include completing a transaction, determining a transaction card 112 is outside the operating range of a access point terminal, receiving a request from a user of the mobile host device, and/or others. For example, the institution 106 may identify a mobile host device 110 associated with a card 112 that executed a transaction and transmit transaction information to the mobile host device 110 using the cellular core network 202. In using the cellular core network 202, the institutions 106 may transmit information to the transaction card 112 without requiring an access point terminal being proximate to the card 112. In addition or alternatively, the institution 106 may request information from the mobile host device 110, the transaction card 112 and/or the user using the cellular core network 202. For example, the institution 106 may transmit a request for transaction history to the card 112 through the cellular core network 202 and the mobile host device 110. In some implementations, the mobile host device 110c may operate as a mobile Point of Sale (POS) terminal configured to wirelessly execute transactions with the smart card 214. For example, a vendor may be mobile (e.g., a taxi driver) and may include a mobile host device 110c with a transaction card 112c. In this example, the transaction card 112c may wirelessly receive account information from the smart card 214 and transmit an authorization request to the institution 106 using the mobile host device 110 and the cellular core network 202.

In some implementations, the system 100 may execute one or more of the modes discussed with respect to FIG. 1. For example, the transaction card 112 may be re-personalized/updated using the cellular radio technology of the mobile host device 110. The user may want to re-personalize the transaction card 112 to change host devices, to have multiple host devices, and/or other reasons. In regards to the software device management, the user may transmit to the institution 106 a request to re-personalize the transaction card 112 using the cellular radio technology of the host device 110.

Figure 3:
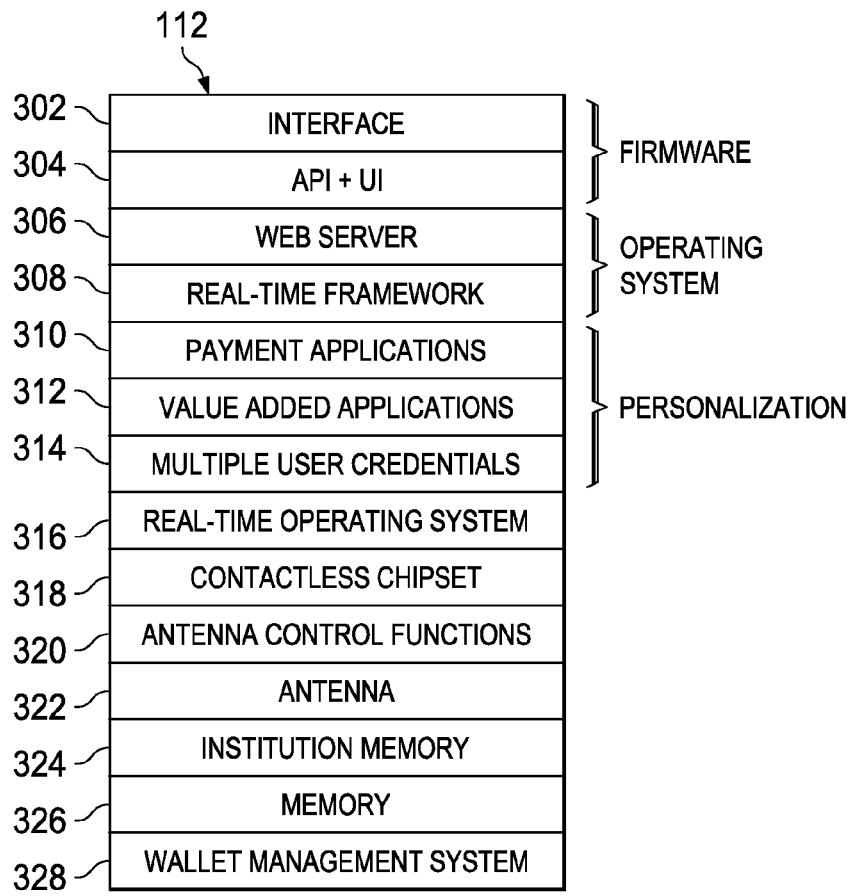
FIG. 3 is an example transaction card of FIG. 1 in accordance with some implementations of the present disclosure.

FIG. 3 illustrates is a block diagram illustrating an example transaction card 112 of FIG. 1 in accordance with some implementations of the present disclosure. In general, the transaction card 112 includes personalized modules that execute transactions (e.g., financial) independent of the mobile device 110. The illustrated transaction card 112 is for example purposes only, and the transaction card 112 may include some, all or different modules without departing from the scope of this disclosure.

In some implementations, the transaction card 112 can include an interface layer 302, an API/UI 304, a Web server 306, a real-time framework 308, payment applications 310, value added applications 312, multiple user credentials 314, real-time OS 316, contactless chipset 318, antenna control functions 320, antenna 322, institution memory 324, free memory 326, and a wallet management system 328. In some implementations, a host controller includes the interface layer 302, he API/UI 304, the Web server 306, the real-time framework 308, the contactless chipset 318, and the antenna control functions 320. In some implementations, a security module includes the payment applications 310 and the user credentials 314. The institution memory 324 and free memory 326 may be contained in Flash. In some implementations, the contactless chipset 318 may be integrated within the security module or operated as a standalone. The antenna 322 may be electronic circuitry.

The interface layer 302 includes interfaces to both the host device, i.e., physical connection, and the external world, i.e., wireless connection. In payment implementations, the wireless connection can be based on any suitable wireless standard such as contactless (e.g., ISP 14443 A/B), proximity (e.g., ISO 15693), NFC (e.g., ISO 18092), and/or others. In some implementations, the wireless connection can use another short range wireless protocol such as Bluetooth, another proprietary interfaces used by retail payment terminals (Felica in Japan, MiFare in Asia, etc.), and/or others. In regards to the physical interface, the interface layer 302 may physically interface the mobile device 110 using an SD protocol such as MicroSD, Mini-SD or SD (full-size). In some implementations, the physical interface may include a converter/adapter to convert between two different protocols based, at least in part, on the mobile device 110. In some implementations, the mobile device 110 may communicate using protocols such as USB, MMC, iPhone proprietary interface, or others.

The API/UI layer 304 can include any software, hardware, and/or firmware that operates as an API between the mobile device 110 and the transaction card 112 and as the GUI 111. Prior to executing transactions, the transaction card 112 may automatically install drivers in the mobile device 110 in response to at least insertion. For example, the transaction card 112 may automatically install a MicroSD device driver in the device 110 to enable the transaction card 112 to interface the mobile device 110. In some implementations, the transaction card 112 may install an enhanced device driver such as the a Mass Memory with Radio (MMR) API. In this implementation, the interface can drive a class of plug-ins that contain mass memory as well as a radio interface. The MMR API may execute one or more of the following: connect/disconnect to/from the MMR controller (Microcontroller in the plug-in); transfer data using MM protocol (e.g., SD, MMC, XD, USB, Firewire); send encrypted data to the MMR controller; receive Acknowledgement of Success or Error; received status word indicating description of error; turn radio on/off; send instruction to the transaction card 112 to turn the antenna on with specifying the mode of operation (e.g., sending mode, listening mode); transmit data such as send instruction to controller to transmit data via the radio; listen for data such as send instruction to controller to listen for data; read data such as send instruction to controller to send the data received by the listening radio; and/or others. In some implementations, MMR can be compliant with TCP/IP. In some implemenetations, API encapsulated ISO 7816 commands may be processed by the security module in addition to other commands.

In some implementations, the API can operate in accordance with the two processes: (1) the transaction card 112 as the master and the mobile device 110 as the slave; and (2) the card UI as the master. In the first process, the transaction card 112 may pass one or more commands to the mobile device 110 in response to, for example, insertion of the transaction card 112 into a slot in the mobile device 110, a transaction between the transaction card 112 and the access point 114, and/or other events. In some implementations, the transaction card 112 can request the mobile device 110 to execute one or more of following functions: Get User Input; Get Signature; Display Data; Send Data; Receive Data; and/or others. The Get User Input command may present a request through the GUI 111 for data from the user. In some implementations, the Get User Input may present a request for multiple data inputs. The data inputs may be any suitable format such as numeric, alphanumeric, and/or other strings of characters. The Get Signature command may request the mobile device 110 to return identification data such as, for example, a phone number, a network code, a connection status, location information, Wi-Fi beacons, GPS data, and/or other device specific information. The Display Data command may present a dialog to the user through the GUI 111. In some implementations, the dialog can disappear after a period of time, a user selection, and/or other event. The Send Data command may request the mobile device 110 to transmit packet data using its own connection to the external world (e.g., SMS, cellular, Wi-Fi). The Receive Data command may request the mobile device 110 to open a connection channel with certain parameters and identify data received through the connection. In some implementations, the command can request the mobile device 110 to forward any data (e.g., SMS) satisfying certain criteria to be forwarded to the transaction card 112.

In regards to the UI as master, the UI may execute one or more of the following commands: Smart Card Command/Response; Activate/Deactivate; Flash Memory Read/Write; Send Data with or without encryption; Receive Data with or without decryption; URL Get Data/URL Post Data; and/or others. The security module commands may relate to security functions provided by the card and are directed towards the security module within the transaction card 112 (e.g., standard ISO 7816 command, proprietary commands). In some implementations, the commands may include encryption, authentication, provisioning of data, creation of security domains, update of security domain, update of user credentials after verification of key, and/or others. In some implementations, the commands may include non security related smart card commands such as, for example, read transaction history commands. The read transaction history command may perform a read of the secure memory 324 of the transaction card 112. In some implementations, certain flags or areas of the secure memory 324 may be written to after security verification. The Activate/Deactivate command may activate or deactivate certain functions of the transaction card 112. The Flash Memory Read/Write command may execute a read/write operation on a specified area of the non-secure memory 326. The Send Data with or without encryption command may instruct the transaction card 112 to transmit data using its wireless connection with, for example, the access point 114. In addition, the data may be encrypted by the transaction card 112 prior to transmission using, for example, keys and encryption capability stored within the security module. The Receive Data with or without decryption command may instruct the transaction card 112 to switch to listening mode to receive data from its wireless connection with the terminal/reader (e.g., access point 114). In some implementations, data decryption can be requested by the security module using, for example, keys and decryption algorithms available on the security module, i.e., on-board decryption. The URL Get Data/URL Post Data command may instruct the web server 306 to return pages as per offline get or post instructions using, for example, offline URLs.

The Web server 306, as part of the OS of the transaction card 112, may assign or otherwise associate URL style addressing to certain files stored in the memory 326 (e.g., flash) of the transaction card 112. In some implementations, the Web server 306 locates a file using the URL and returns the file to a browser using standard HTTP, HTTPS style transfer. In some implementations, the definition of the files can be formatted using standard HTML, XHTML, WML and/or XML style languages. The file may include links that point to additional offline storage locations in the memory 326 and/or Internet sites that the mobile device 110 may access. In some implementations, the Web server 306 may support security protocols such as SSL. The Web server 306 may transfer an application in memory 326 to the mobile device 111 for installation and execution.

As part of the Real time OS, the real-time framework 308 may execute one or more functions based, at least in part, on one or more periods of time. For example, the real-time framework 308 may enable an internal clock available on the CPU to provide timestamps in response to at least requested events. The real-time framework 308 may allow certain tasks to be pre-scheduled such that the tasks are executed in response to at least certain time and/or event based triggers. In some implementations, the real-time framework 308 may allow the CPU to insert delays in certain transactions. In some implementation, a part of WAP standards called WTAI (Wireless Telephoney Application Interface) can be implemented to allow offline browser pages on the card 112 to make use of functions offered by the mobile device 110 (e.g., send/receive wireless data, send/receive SMS, make a voice call, play a ringtone etc.)

The real-time OS 316 may execute or otherwise include one or more of the following: real-time framework 308; a host process that implements the physical interface between the transaction-card CPU and the mobile device 110; an interface that implements the physical interface between the transaction-card CPU and the security module; a memory-management process that implements the ISO 7816 physical interface between the transaction-card CPU and the memory 324 and/or 326; an application-layer process that implements the API and UI capabilities; the Web server 306; antenna-control functions 320; power management; and/or others. In some implementations, the real-time OS 316 may manage the physical interface between the transaction-card CPU and the secure memory 324 that includes memory segmentation to allow certain memory areas to be restricted access and/or data buffers/pipes. In some implementations, the security module can include a security module OS provided by the security module Vendor and may be compliant with Visa and MasterCard specifications. The security module OS may structure the data in the security module to be compliant with Paypass and/or payWave specifications or any other available contactless retail payment industry specifications. In addition, the security module may store host device signatures and allow modes of the antenna 322 in the secure element 324. In some implementations, the real-time OS 316 may include a microcontroller OS configured to personalizing the secure element 324 such as by, for example, converting raw FV data (account number, expiry date, CCV, other application specific details) into secure encrypted information. In addition, the microcontroller OS may present the card 112 as a MicroSD mass storage to the host device. The microcontroller OS may partition the memory into a user section and a protected device application section. In this example, the device application section may be used to store provider specific applications that either operate from this segment of the memory or are installed on the host device from this segment of the memory.

The security module chip may provide tamper-resistant hardware security functions for encryption, authentication, management of user credentials using multiple security domains, on-board processing capabilities for personalization, access and storage, and/or others. In some implementations, the security module chip can include the contactless chipset 318.

The contactless chipset 318 may provides the hardware protocol implementation and/or drivers for RF communication. For example, the contactless chipset 318 may include on-board RF circuitry to interface with an external world connection using a wireless/contactless connection. The wireless connection may be, for example, client to node (terminal/reader/base station), node to client (passive tag), or peer to peer (another transaction card 112).

The antenna control function 320 may controls the availability of the RF antenna. For example, the antenna control function 320 may activate/deactivate the antenna 322 in response to, for example, successful authentication, completion of a routine established by the OS 316, and/or other event. The antenna 322 may be a short range wireless antenna connected to an NFC inlay via a software switch such as a NAND Gate or other element.

The wallet management system 328 may selectively switch between the multiple credentials 314 when executing transactions. For example, the wallet management system 328 may identify a default account, switching rules, and/or other information. In some implementations, the wallet management system 328 may automatically switch to default user credentials in response to at least an event such as completion of a transaction using non-default credentials. The switching rules may identifying user credentials and associated events such that the wallet management system 328 switches to user credentials in response to at least determining an event.

Figure 4:
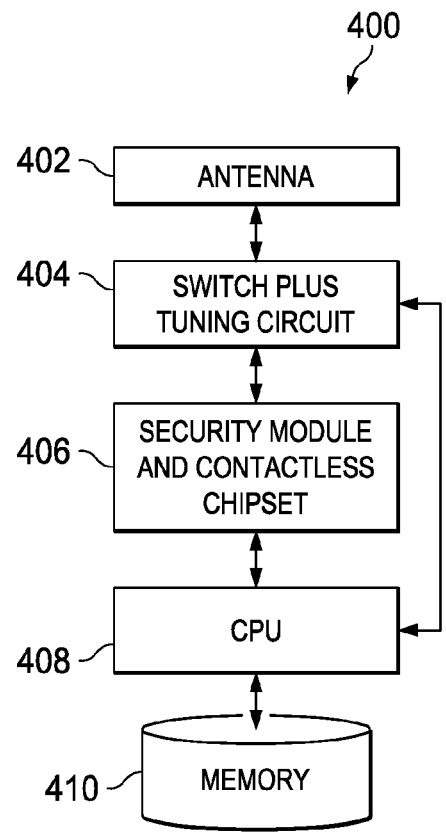
FIG. 4 is an example intelligent card that selectively switching an antenna.

FIG. 4 is a block diagram illustrating an example intelligent card 400 in accordance with some implementations of the present disclosure. For example, the transaction card of FIG. 1 may be implemented in accordance with the illustrated intelligent card 400. In general, the intelligent card 400 may independently access services and/or transactions. The intelligent card 400 is for illustration purposes only and may include some, all, or different elements without departing from the scope of the disclosure.

As illustrated, the intelligent card 400 includes an antenna 402, a switch plus tuning circuit 404, a security module and contactless chipset 406, a CPU 408 and memory 410. The antenna 402 wirelessly transmits and receives signals such as NFC signals. In some implementations, the switch plus tuning circuit 404 may dynamically adjust the impedance of the antenna 402 to tune the transmit and/or receive frequency. In addition, the switch plus tuning circuit 404 may selectively switch the antenna 402 on and off in response to at least a command from the CPU 408. In some implementations, the antenna 402 can be a short range wireless antenna connected to an NFC inlay via a software switch such as an NAND Gate or other element to allow for code from the CPU 408 to turn the antenna 402 on and off. In some implementations, the disk 400 may include an NFC inlay (not illustrated) that can be a passive implementation of NFC short range wireless technology deriving power from the reader terminal in order to transmit data back or a stronger implementation using an eNFC chipset to power active reader mode and self-train mode. In addition, the disk 400 may include an external needle point reset (not illustrated) that prompts the CPU 408 to depersonalize the memory or secure element.

The CPU 408 may transmit the switching command in response to an event such as a user request, completion of a transaction, and/or others. When switched on, the security chip and contactless chipset 406 is connected to the antenna 402 and executes one or more of the following: format signals for wireless communication in accordance with one or more formats; decrypt received messages and encrypt transmitted messages; authenticate user credentials locally stored in the memory 410; and/or other processes. The memory 410 may include a secure and non-secured section. In this implementation, the secure memory 410 may store one or more user credentials that are not accessible by the user. In addition, the memory 410 may store offline Web pages, applications, transaction history, and/or other data. In some implementations, the memory 410 may include Flash memory from 64 MB to 32 GB. In addition, the memory 410 may be partitioned into user memory and device application memory. The chipset 406 may include a security module that is, for example Visa and/or MasterCard certified for storing financial vehicle data and/or in accordance with global standards. In addition to a user's financial vehicle, the secure element may store signatures of allowed host devices and/or antenna modes.

Figure 7A:
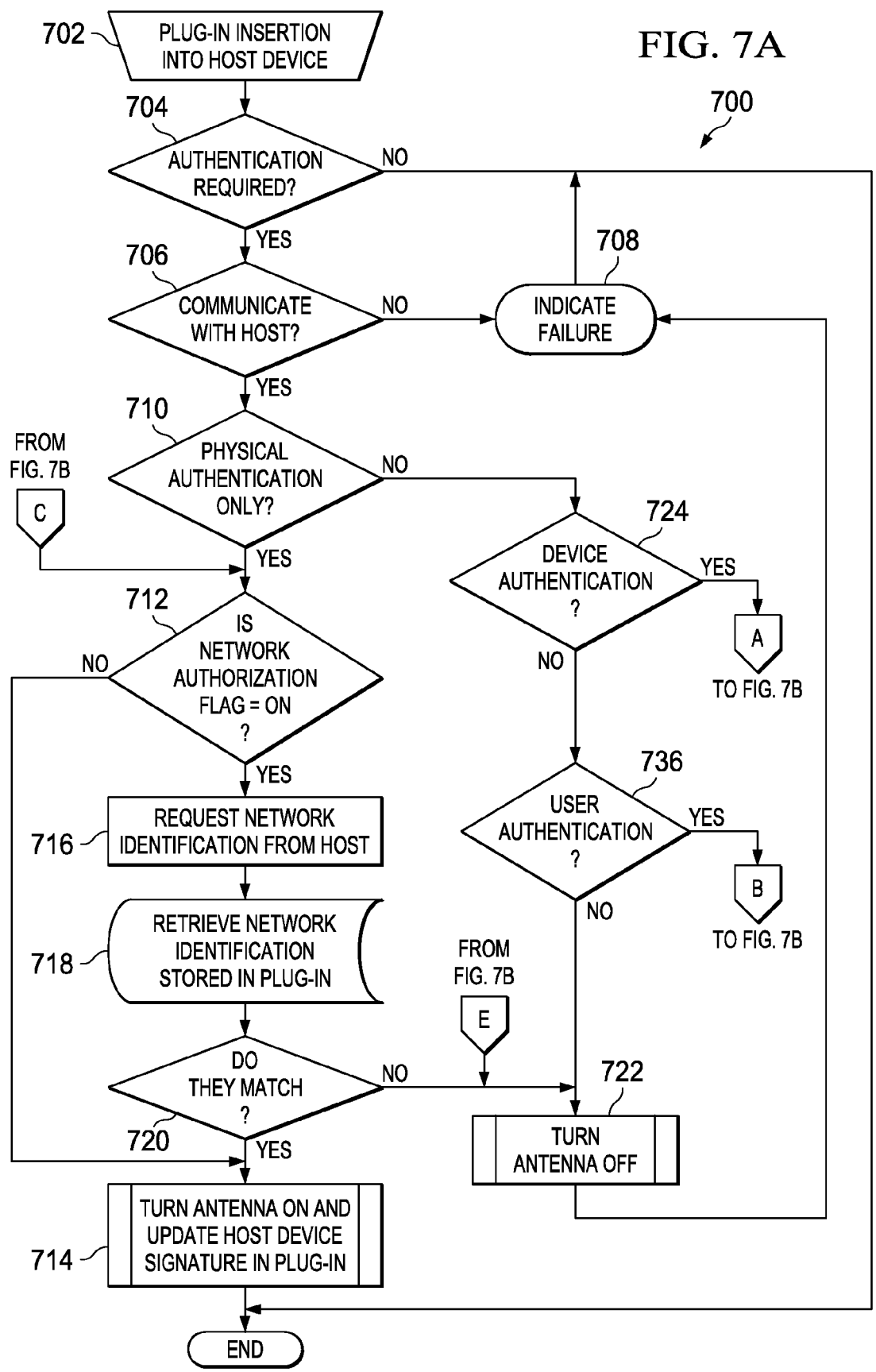
FIGS. 7A and B is a flow chart illustrating an example method for initialize an intelligent card.
Figure 7B:
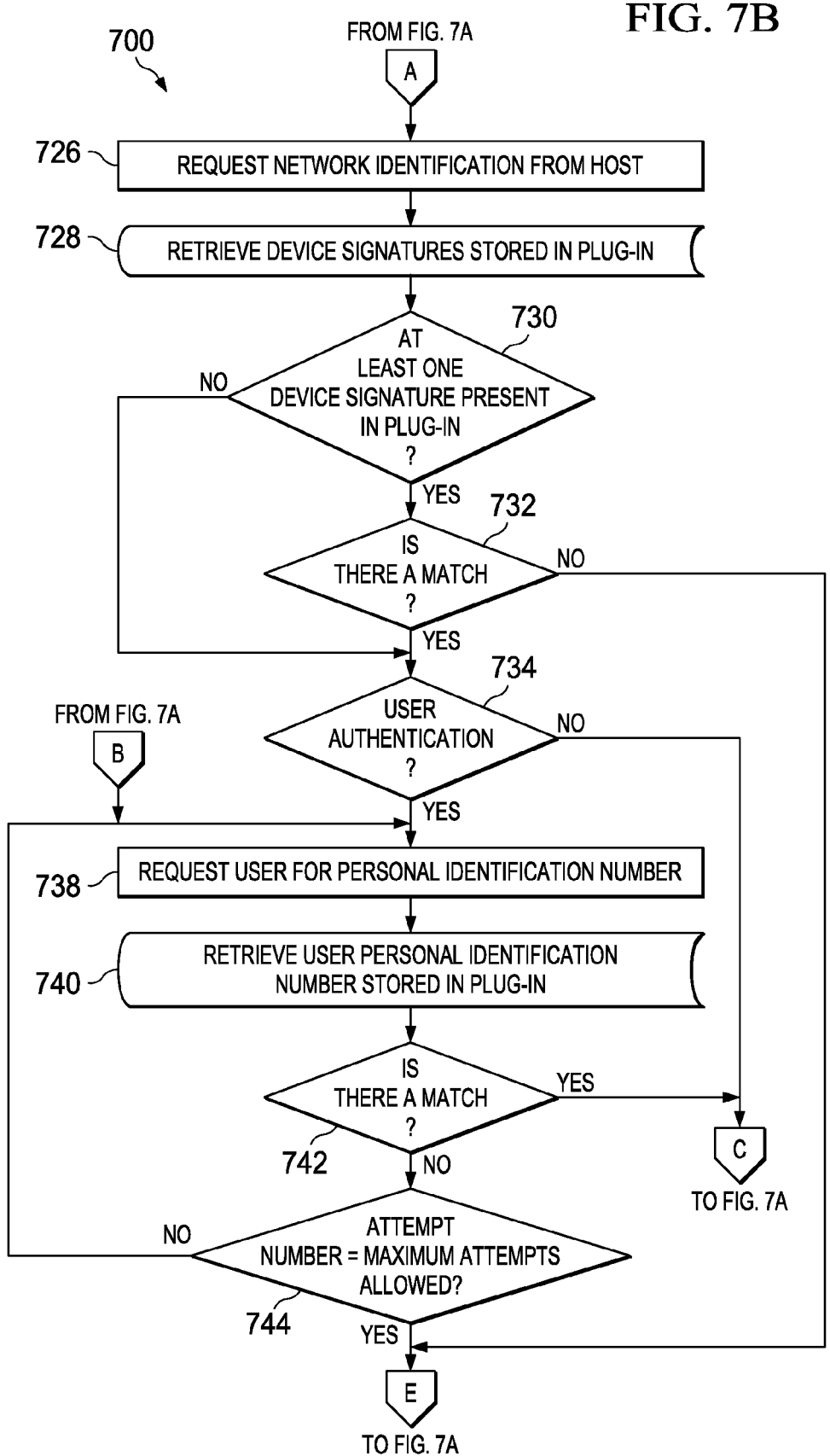

In some implementations, the CPU 408 may switch the antenna 402 between active and deactivate mode based, at least in part, on a personalization parameter defined by, for example, a user, distributor (e.g., financial institution, service provider), and/or others. For example, the CPU 408 may activate the antenna 402 when the intelligent card 400 is physically connected to a host device and when a handshake with the host device is successfully executed. In some implementations, the CPU 408 may automatically deactivate the antenna 402 when the intelligent card 400 is removed from the host device. In some implementations, the antenna 402 is always active such that the intelligent card 400 may be used as a stand-alone access device (e.g., device on a keychain). In regards to the handshaking process, the CPU 408 may execute one or more authentication processes prior to activating the intelligent card 400 and/or antenna 402 as illustrated in FIG. 7. For example, the CPU 408 may execute a physical authentication, a device authentication, and/or a user authentication. For example, the CPU 408 may activate the antenna 402 in response to at least detecting a connection to the physical interface with the host device (e.g., SD interface) and successful installation of the device driver for mass memory access (e.g., SD device driver) on the host device. In some implementations, device authentication may include physical authentication in addition to a signature comparison of a device signature stored in memory (e.g., security module) that was created during first-use (provisioning) to a run-time signature calculated using, for example, a unique parameter of the host device. In the event no host device signature exists in the memory, the CPU 408 may bind with the first compatible host device the disk 400 is inserted into. A compatible host device may be a device that can successfully accomplish physical authentication successfully. If a host-device signature is present in the memory, the CPU 408 compares the stored signature with the real-time signature of the current host device. If the signatures match, the CPU 408 may proceed to complete the bootstrap operation. If the signatures do not match, host device is rejected, bootstrap is aborted and the disk 400 is returned to the mode it was before being inserted into the device.

User authentication may include verification of physical connection with a user using a PIN entered by the user, a x.509 type certificate that is unique to the user and stored on the host device, and/or other processes. Device and user authentication may verify a physical connection with device through comparison of a device signature and user authentication through verification of user PIN or certificate. In some implementations, the user can select a PIN or certificate at provisioning time. If this case, the CPU 408 may instantiate a software plug-in on the host device. For example, a software plug-in may request the user for his PIN in real time, read a user certificate installed on the device (e.g., x.509), and/or others. The operation of the software plug-in may be customized by the provider. Regardless, the returned user data may be compared with user data stored in the memory. In case of a successful match, the antenna 402 may be activated. In case of an unsuccessful match of a certificate, then disk 400 is deactivated. In case of unsuccessful PIN match, the user may be requested to repeat PIN attempts until a successful match or the number of attempts exceeds a threshold. The disk provider may customize the attempt threshold.

In regards to network authentication, the host device may be a cellphone such that the disk 400 may request network authentication prior to activation. For example, the disk 400 may be distributed by a Wireless Network Operator (WNO) that requires a network authentication. In this example, a flag in memory may be set to ON indicating that network authentication is required. If the flag is set to ON, a unique identity about the allowed network is locally stored in memory such a Mobile Network Code for GSM networks, a NID for CDMA networks, a SSID for broadband networks, and/or identifiers. If this flag is ON, the CPU 408 in response to at least insertion may request a special software plug-in to be downloaded to the host device and instantiated. This software plug-in may query the host device to respond with network details. In some cases, the type of unique network identity employed and the method to deduce it from the host device may be variable and dependent on the network provider and capability of the host device. If the locally-stored ID matches the request ID, the CPU 408 activated the antenna 402 to enable access or otherwise services are denied.

Figure 5:
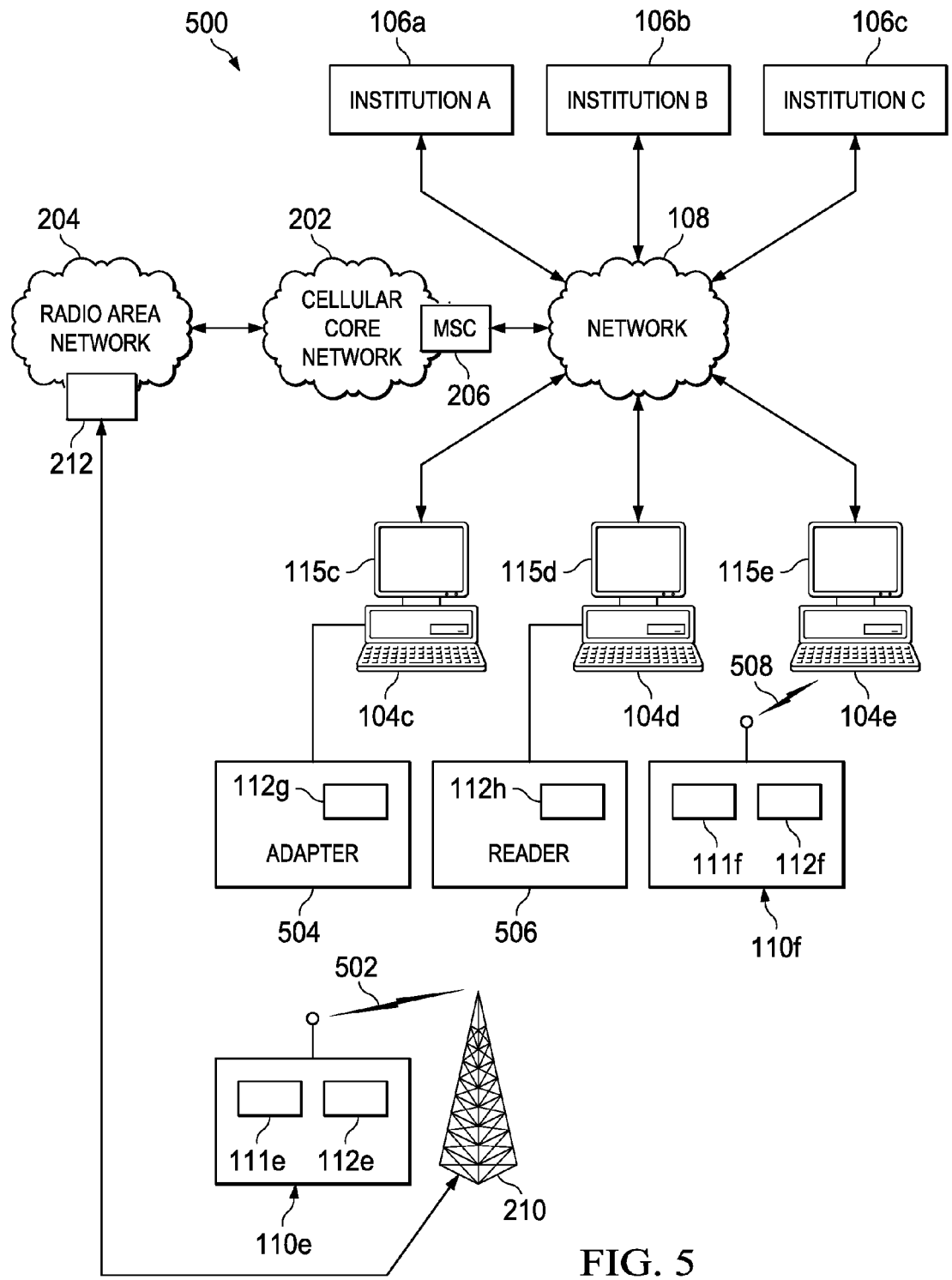
FIG. 5 is another example transaction system in accordance with some implementations of the present disclosure.

FIG. 5 illustrates an example transaction system 500 for wirelessly communicating transaction information using one of a plurality of interfaces. For example, the system 500 may interface the transaction card 112 using a wired or wireless interface. In regards to wired interfaces, the system 500 includes an adaptor 504 and a reader 506. The adaptor 504 can include any software, hardware, and/or firmware configured to translated between a format compatible with the card 112 and a format compatible with the client 104c. For example, the adaptor 504 may translate between microSD protocol and a USB protocol. The reader 506 can include any software, hardware, and/or firmware configured to directly interface with the card 112h. For example, the reader 506 may be a microSD reader such that the client 104d interfaces with the card 112h using a microSD protocol. In regards to wireless interfaces, the system 500 may include a cellular interface 502 and a short-range wireless interface 508. In regards to the cellular interface 502, the institutions 106 may wirelessly communicate with the transaction card 112e using the cellular radio technology of the mobile device 110e. For example, the cellular interface 502 may be a CDMA interface, a GSM interface, a UMTS interface, and/or other cellular interfaces. In regards to the short-range wireless interface 508, the institutions 106 may wirelessly communicate with the transaction card 112f using, for example, WiFi technology. The short-range wireless interface 508 may be an 802.11 interface, a Bluetooth interface, and/or other wireless interface. In these implementations, the client 104e may include a transceiver used for wireless communication with the transaction card 112f.

Figure 6:
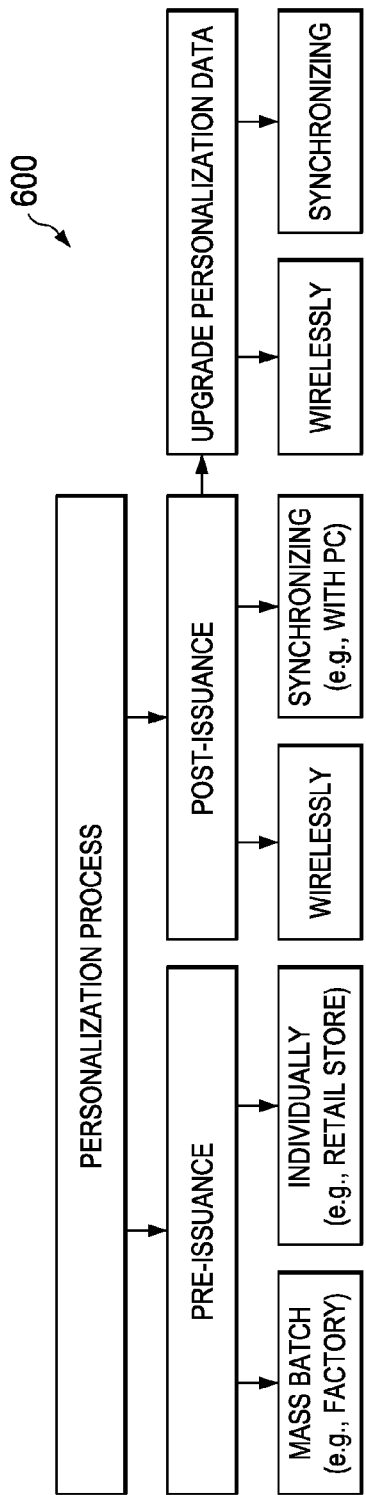
FIG. 6 is a schematic diagram illustrating personalization processes of intelligent cards.

FIG. 6 is a schematic diagram 600 of personalization of a intelligent card (e.g., the transaction card 112, the service card 210). In particular, the intelligent card may be personalized prior to being issued to a user, i.e., pre-issuance, or after being issued to a user, i.e., post-issuance. In regards to pre-issuance, intelligent cards may be personalized in mass batches at, for example, a factory. In this example, each intelligent card may be loaded with user credentials, security framework, applications, offline Web pages, and/or other data. In some implementations, a intelligent card may be personalized individually at, for example, a bank branch. In this case, a intelligent card may be individually loaded with data associated with a user after, for example, purchasing the disk. As for post issuance, the intelligent card may be personalized wirelessly. For example, the transaction card 112 may be personalized through a cellular connection established using the mobile device 110. In some implementations, an intelligent card may be personalized by synchronizing with a computer such as client 104.

In some implementations, provisioning of the intelligent card can be based, at least in part, on the distribution entity (e.g., financial institution, wireless operator, user). For example, the intelligent card may be distributed by a financial institution such as a bank. In the bank implementation, the intelligent card can be pre-provisioned with user accounts. In this case, the intelligent card may be activated in response to at least initial insertion into a host device. The antenna mode may be set to physical authentication only by default. In some examples, the user may self-select a PIN authentication to prevent unauthorized use or through a PC cradle and plug-in management software if the host device does not have a screen and keyboard. In the wireless-operator implementation, the intelligent card may require device authentication before activation. In some examples, the user may provision financial data (e.g., credit or debit) using one of several methods. In addition, the user may add user authentication. In the user-provided implementation, the user may acquire the intelligent card from, for example, a retail store or other channels like OEM host device manufacturers. In this case, the user may activate the disk in a plurality of different devices with provider selected provisioning.

In regards to activating for financial transactions, the intelligent card may be configured in memory mode when user acquires the disk from, for example a bank, a wireless operator, a third-party provider, and/or others. Activation of the disk may include the following two levels: 1) physically, specifying antenna availability under a specific set of circumstances desired by the provider; and b) logically, at the financial institution signifying activation of the financial vehicle carried on the disk. In some implementations, activation may be based, at least in part on device distributor, antenna availability selection, and/or type of host device as illustrated in Table 1 below.

TABLE 1

| Plug-in Seller and Mode of distribution | Plug-In Initial State and Antenna Availability Choice | Device Has No Screen/Keyboard | Device Has Screen & keyboard |
|---|---|---|---|
| FI: Financial Institution (bank or retailer) ships plug-in directly to the subscriber or through participating resellers/distributors etc. | Plug-In is in Memory Mode, It is fully personalized with user's account information (FV) and Antenna mode is set to Physical Authentication | Manual: User has to call FI's number to activate his account, the Device can only work with a single account. User can also access FI's site on the internet using another PC to activate his account | If the device is capable of wireless access, upon insertion, the plug-in spawns a web page and takes the user to FI's website. The user self activates his account by entering his account number and matching secret personal information (last 4 digits of SSN or home phone number for example). The user can also optionally select a PIN (change Antenna availability to user authentication) at the same time. If Internet connection is not available, the device can automatically dial a voice call to FI's number for account activation. If wireless connection is not available as well (device is only a PDA), the user has to fallback to manual activation (see left) |
| WNO: Wireless Network Operator Ships plug-in bundled with host device, User can select his preferred host device and plugin is bundled with it if user would like to avail of this service | Plug-In is in Memory Mode, it is partially personalized (device signature of the host device loaded to prevent user from changing host device) while FV information is not loaded. Antenna Availability is set to Device Authentication (plug-in can only used with host device it is shipped with) | Not Applicable | Assumption: Device has a functional wireless connection. Operator offers a bundled wallet management application. When user clicks the wallet management application, the user is invited to sign-up with operator's partner FI for a new account. Once sign-up is successful, account data is downloaded Over the Air or Over the Internet to the plugin and it is activated for use |

TABLE 1-continued

| Plug-in Seller and Mode of distribution | Plug-In Initial State and Antenna Availability Choice | Device Has No Screen/ Keyboard | Device Has Screen & keyboard |
|---|---|---|---|
| WNO: Wireless Network Operator Ships plug-in as an accessory with an advice for compatible devices, User can select his preferred host device and attempt to operate his plug-in with, to avail of the service | Plug-In is in Memory Mode, it is unpersonalized. Antenna Availability is set to Network authentication is set to On. Plug-In will bind to first device it is inserted in and where network authentication is successful | Not Applicable | Device can use multiple FIs in this scenario and store multiple FVs. User can select to enter a PIN for an FV in the wallet management application in order to convert Antenna availability to user and device authentication for that FV Plug-in is bound to a device signature. When removed from the device, the Antenna turns off and the plug-in turns into a simple mass memory stick. When Plug-in is inserted into another host device, the signature doesn't match and Antenna remains off. Assumption: Device has functional wireless connection. Plug-In will spawn an internet connection to the operator portal and the wallet management application will be downloaded upon user confirmation. User can reject download and choose to manually provision FV data by going to a third party wallet provider or directly to the FI website. Plug-In is bound to the device and to the network provider's network. If the same device is unlocked and used on another network, the plug-in will cease to operate and will revert back to memory mode. When removed from the device, the plug-in will revert to the memory mode. |
| OEM 1: Cellphone manufacturer | Device Authentication (device comes bundled with a cellphone) | Not Applicable | Option A: Device Manufacturer offers a wallet management application, rest of the process remains as above Option B: Wireless Operator offers a wallet management application. User goes to the wireless operator portal and downloads this application Over the Air. The rest of the process then remains the same as above Option C: User navigates to a third party wallet management application (example paypal or Google). Sign up is offered to participating FIs and FVs are personalized on the plug-in Over the Internet Option D: User navigates to FI's website and activates a new account which is personalized over the Internet on the plug-in |

TABLE 1-continued

| Plug-in Seller and Mode of distribution | Plug-In Initial State and Antenna Availability Choice | Device Has No Screen/ Keyboard | Device Has Screen & keyboard |
| --- | --- | --- | --- |
| OEM 2: Other manufacturer | Device Authentication | User has to cradle the device to the PC with an internet connection and sign-up on the PC by going to an FI's website directly. Account is downloaded over the internet via the cradle and then the device is activated. In this process, the plug-in is bound to the device signature. When removed from the host device, the antenna turns off When plugged into another device, the device signature fails and the device behaves like a mass memory device only | If the device has wireless connection (it is a wireless PDA): Same as above If the device has no wireless connection (it is an unconnected PDA): Same as left |

The illustrated chart is for example purposes only. The user may activate an intelligent card using the same, some, or different processes without departing from the scope of this disclosure.

In the illustrated implementations, the transaction card 112 may be upgraded to execute a wallet system using multiple user credentials. For example, the transaction card 112 may upgraded with, for example, the wallet management system 328 through a wireless or wired connection. In addition to upgrading the transaction card 112, additional user credentials may be loaded to the memory. In this case, the transaction card 112 may selectively switch between the different user credentials based, at least in part, on rules, user selections, events, and/or other aspects.

FIG. 7 is a flow chart illustrating an example method 700 for automatically bootstrapping an intelligent card in response to at least insertion into a host device. In general, an intelligent card may execute one or more authentication procedures prior to activation. Many of the steps in this flowchart may take place simultaneously and/or in different orders as shown. System 100 or system 200 may use methods with additional steps, fewer steps, and/or different steps, so long as the methods remain appropriate.

Method 700 begins at step 702 where insertion into a host device is detected. For example, the transaction card 112 may detect insertion into the mobile device 110. If authentication is not required for any aspect of the intelligent card at decisional step 704, then execution ends. If authentication is required for at least one aspect, then execution proceeds to decisional step 706. If communication with the host device includes one or more errors, then, at step 708, a failure is indicated to the user. In the example, the transaction card 112 may present an indication of a communication error to the user using the GUI 111. If a communication error is not detected at decisional step 706, then execution proceeds to decisional step 710. In some implementations, the intelligent card uploads an SD driver to the host device. If the intelligent card only requires physical authentication, then execution proceeds to decisional step 712. If the network authentication flag is not set to on, then, at step 714, the antenna is turned on and the intelligent card is updated with host-device signature. As for the example, the transaction card 112 may activate the antenna for wireless transactions and update local memory with the host-device signature. If the network authentication flag is turned on at decisional step 712, then, at step 716, the intelligent card transmits a request for the network ID to the host device. Next, at step 718, the intelligent card retrieves a locally-stored network ID. If the stored network ID and the request network ID match at decisional step 720, then the disk is activated at step 714. If the two network ID's do not match, then the antenna is deactivated at step 722.

Returning to decisional step 710, if the authentication is not only physical authentication, then execution proceeds to decisional step 724. If the authentication process includes device authentication, then, at step 726, the intelligent card transmits a request for a network ID to the host device. At step 728, the intelligent card retrieves a locally stored device signatures. If the intelligent card does not include at least one device signature, then execution proceeds to decisional step 734. If the intelligent card includes one or more device signatures, then execution proceeds to decisional step 732. If one of the device signatures matches the request network ID, then execution proceeds to decisional step 734. If the signatures and the request network ID do not match, then execution proceeds to step 722 for deactivation. If user authentication is not included in the authentication process, then execution proceeds to decisional step 712 for physical authentication. If user authentication is included at decisional step 734, then execution proceeds to step 738.

Returning to decisional step 724, if the authentication process does not include device authentication, then execution proceeds to decisional step 736. If user authentication is not included in the process, then, at step 722, the intelligent card is turned off. If user authentication is included, then, at step 738, the intelligent card request a PIN number from the user using the host device. Again returning to the example, the transaction card 112 may present a request for the user to enter a PIN through the GUI 111. At step 740, the intelligent card retrieves a locally-stored PIN. If the request PIN and stored PIN match at decisional step 742, then execution proceeds to decisional step 712 for physical authentication. If the request PIN and the stored PIN do not match at decisional step 742, then execution proceeds to decisional step 744. If the number of attempts have not exceeded a specified threshold, then execution returns to step 738. If the number of attempts has exceed to the threshold, then the antenna is deactivated at step 722.

Figure 8A:
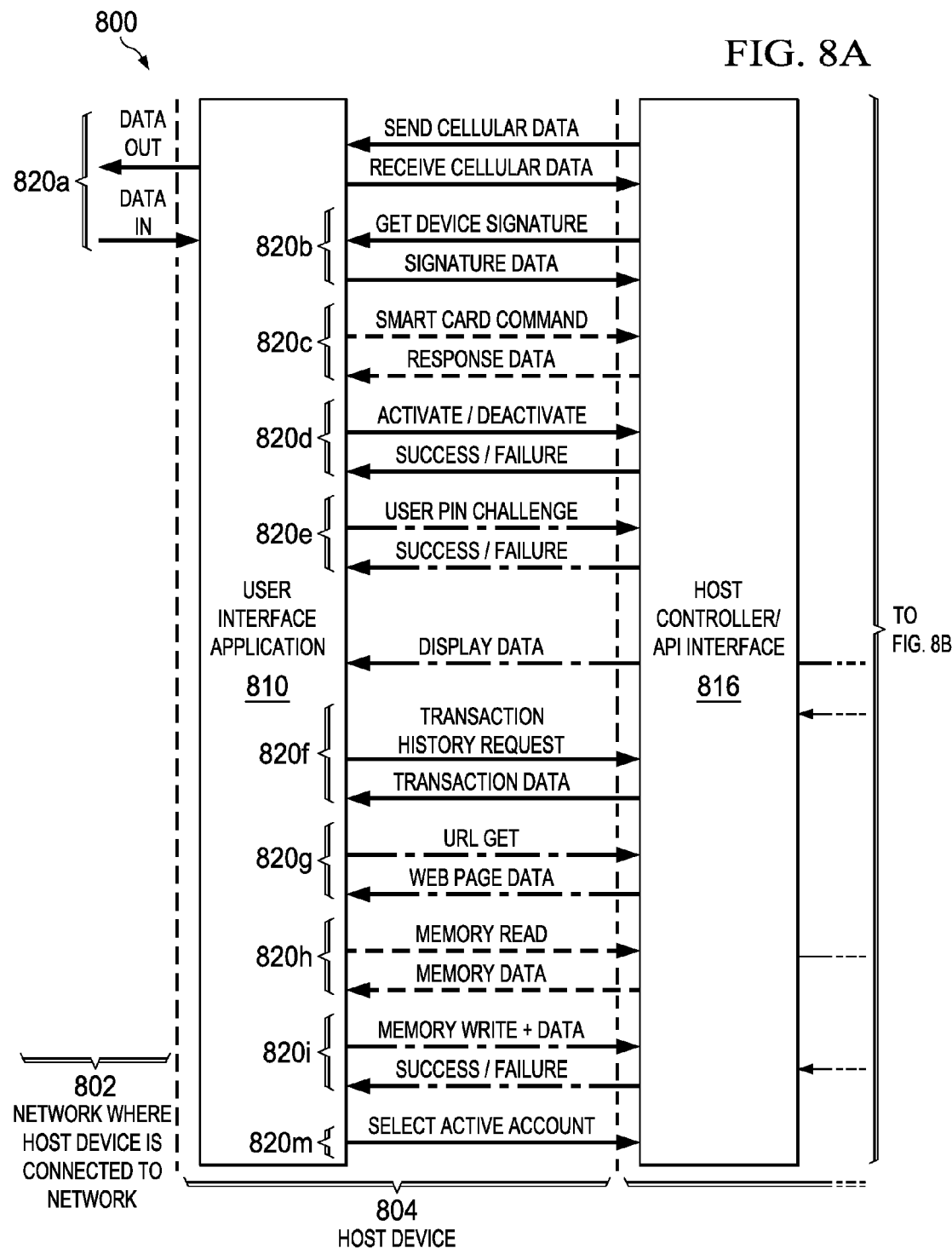
FIGS. 8A-C are an example call flow illustrating call sessions with an intelligent card.
Figure 8B:
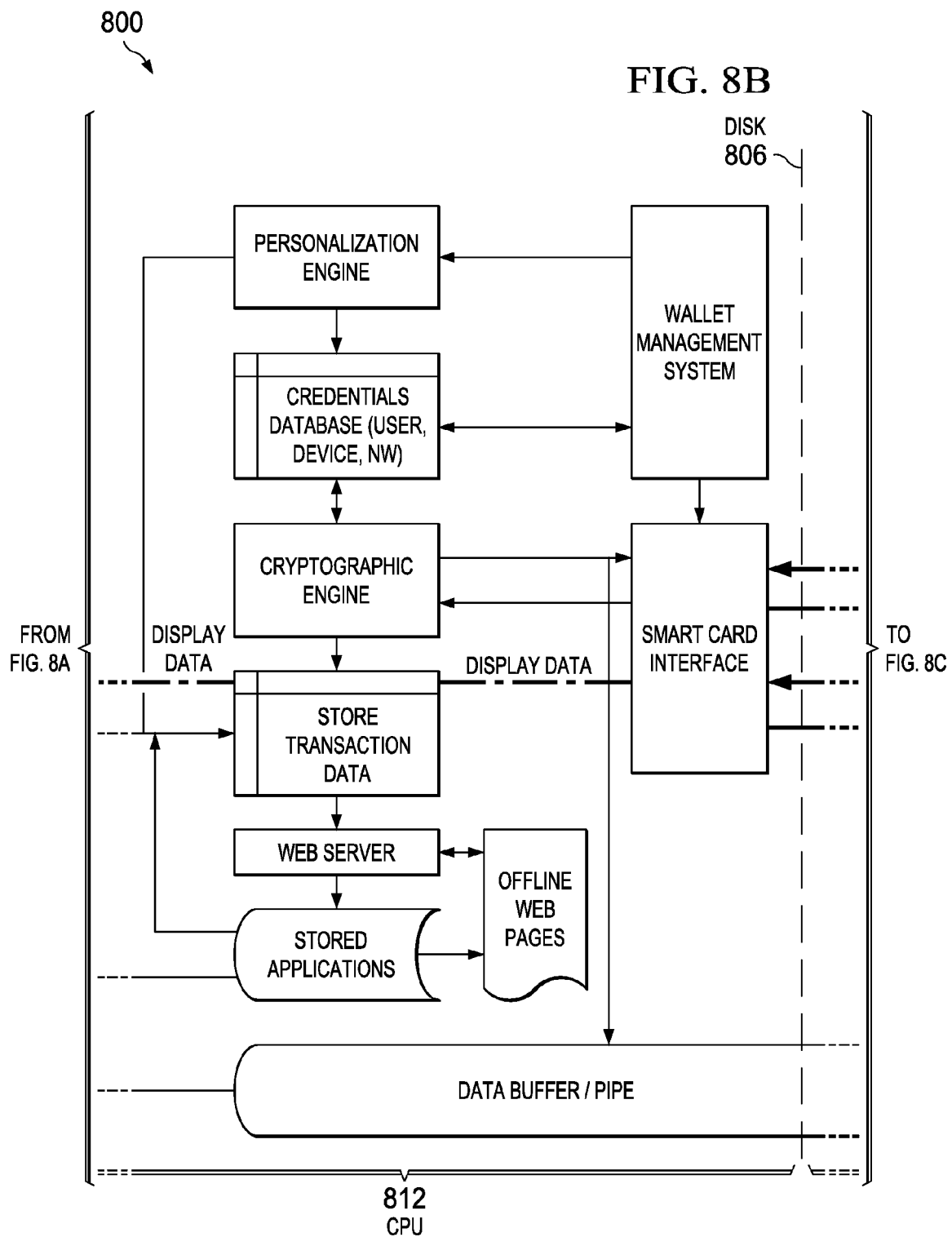
Figure 8C:
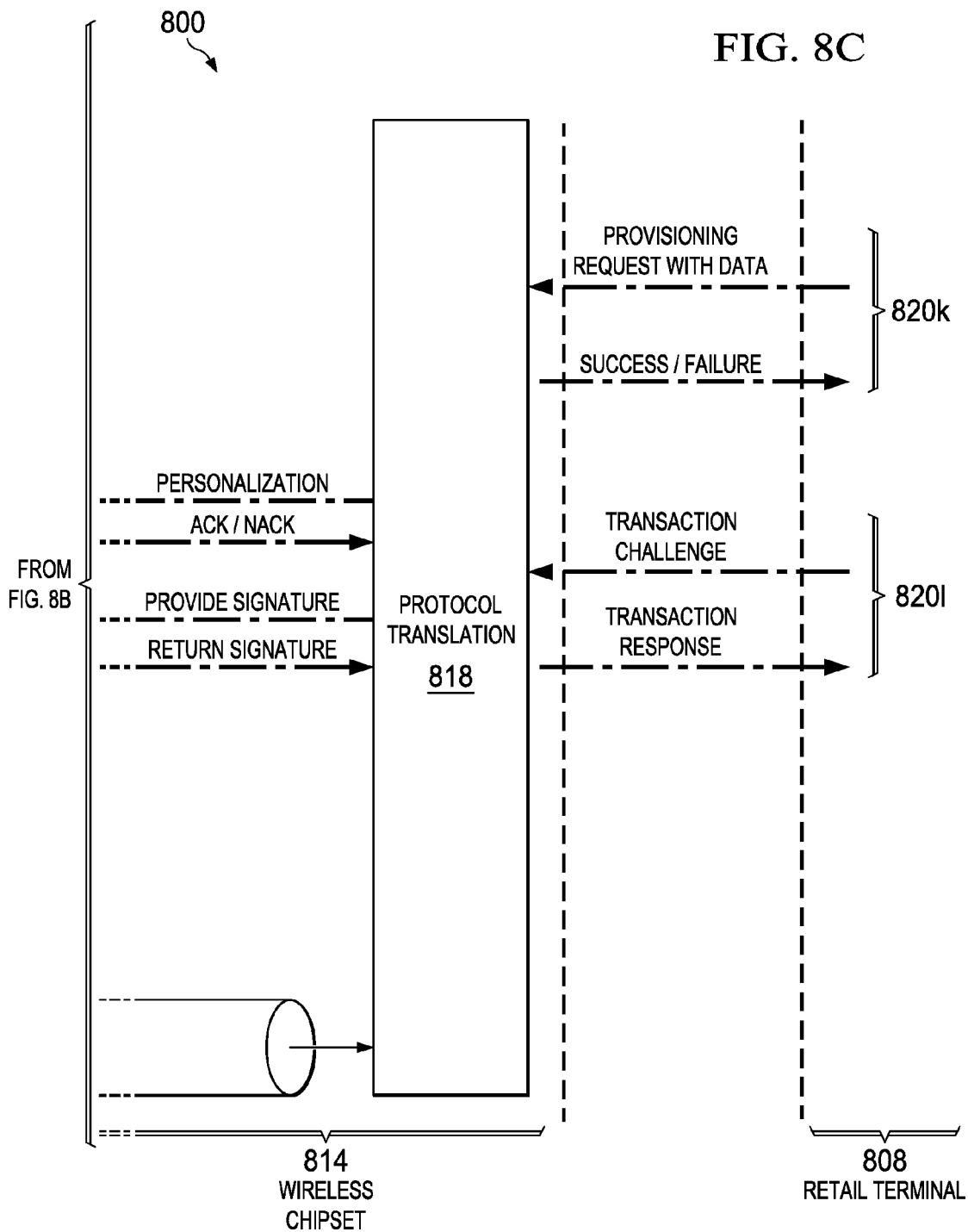

FIG. 8 is an example call flow 800 in accordance with some implementations of the present disclosure. As illustrated, the flow 800 includes a network 802, a host device 804, an intelligent card 806, and a terminal 808. The host device 804 is configured to communicate with the network 802 and includes a slot for insertion of the intelligent card 806. The intelligent card 806 is configured to transmit commands to and receive data from a user interface application 810 executed by the host device 810 and execute transactions independent of the host device 810. The card 806 includes a CPU 812 for executing transactions and a wireless chipset 814 for communicating with the terminal 808. The CPU 812 executes a host controller/API interface 816 configured to transmits commands in a form compatible with the host device 804 and convert data from the host device 804 to a form compatible with the CPU 812.

As illustrated, the flow 800 may include multiple sessions 820 between the host device 804 and the card 806 and between the card 806 and the terminal 808. The session 820a illustrates a session managed by the card 806 using the network capabilities of the host device 810. In this example, the card 806 transmits data for transmission through a cellular network connected to the host device 804, and after receiving the cellular data, the host device 804 transmits the data to the network 802. In response to receiving data from the network 802, the host device 804 may automatically transmit the received data to the card 806. In some implementations, the card 806 may transmit a request for a device signature to the host device 804 as illustrated in session 820b. For example, the card 806 may request the device signature during a bootstrapping process. The session 820c illustrates that a user may submit commands to the card 806 through the interface of the host device 804. For example, the user may request that the disk display the user's transaction history through the interface of the host device 804.

In some implementations, the card 806 may receive a command to activate or deactivate the antenna through the host device 804 as illustrated in session 820d. For example, a financial institution may identify irregular transactions and transmit a command through the network 802 to deactivate the card 806. The card 806 may authorize a user by requesting a PIN using the host device 804. As illustrated in session 820e, the user may submit a PIN to the card 806 using the interface of the host device 804, and in response to an evaluation of the submitted PIN, the card 806 may present through the host device 804 an indication that the user verification is successful or has failed. In some implementations, a user and/or financial institution may request a transaction history of the card 806 as illustrated in session 820f. For example, a financial institution may transmit a request for the transaction history through the network 802 connected to the host device 804, and in response to at last in the request, the card 806 may transmit the transaction history to the financial institution using the network 802 connected to the host device 804. In some implementations, the user may present offline Web pages stored in the card 806 as illustrated in session 820. For example, the card 806 may receive a request to present an offline Web page from the user using the host device 804 and present the offline page using the URL in the request. In some implementations, data stored in the memory of the card 806 may be presented through, for example, the host device 804 as illustrated in session 820h. For example, the user may request specific information associated with a transaction on a certain data and the card 806 may retrieve the data and present the data to the user using the host device 804. In addition, the user may write data to the memory in the card 806 as illustrated in session 820i. For example, the user may update transaction data with an annotation, and in response to at least the request, the card 806 may indicate whether the update was a success or failure. The call session 820m illustrates that selection of the user credentials may be received through the host device 804. For example, the session 820m may switch the user credentials based, at least in part, on a user selecting a graphical element through a GUI of the device 804, wireless signal received by the host device 804, and/or others.

In regards to session between the card 806 and the terminal, the flow 800 illustrates the personalization session 820k and the transaction session 820l. In regards to personalization, a financial institution may personalize a card 806 with user credentials, user applications, Web pages, and/or other information as illustrated in session 820k. For example, the terminal 808 may transmit a provisioning request to the card 806 including associated data. The protocol translation 818 may translate the personalization request to a form compatible with the card 806. In response to at least the request, the CPU 812 transmit an indication whether the personalization was a success or not using the protocol translation 818. Prior to the terminal executing a transaction, the terminal 808 may submit a transaction challenge to the card 806 as illustrated in session 820l. In this case, the card 806 may identify a device signature of the host device 804, present associated data to the user through the host device 804, and transmit the signature to the terminal 808 using the protocol translation 818.

Figure 9:
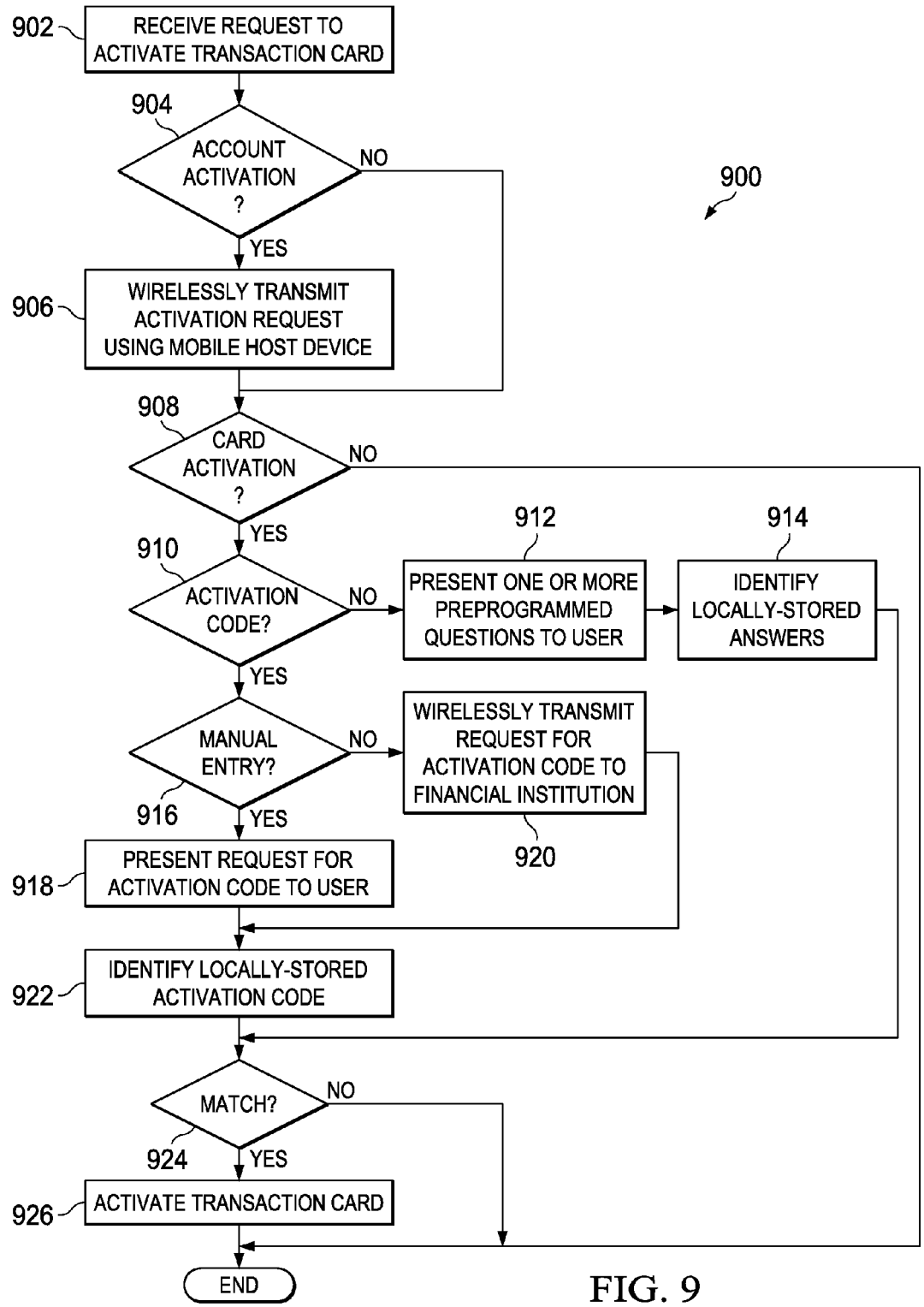
FIG. 9 is a flow chart illustrating an example method for activating a transaction card.

FIG. 9 is a flow chart illustrating an example method 900 for activating a wireless transaction system including an intelligent card. In general, an intelligent card may execute one or more activation processes in response to, for example, a selection from a user. Many of the steps in this flowchart may take place simultaneously and/or in different orders as shown. System 100 or system 200 may use methods with additional steps, fewer steps, and/or different steps, so long as the methods remain appropriate.

Method 900 begins at step 902 where a request to activate a transaction card is received. For example, the user may select a graphical element displayed through the GUI 111 of a mobile host device 110 in FIG. 1. If an account activation is included at decisional step 904, then at step 906, a request to activate the associated user account is wirelessly transmitted to financial institution using cellular radio technology of the host device. For example, the transaction card 112d of FIG. 2 may wireless transmit an activation request to the institution 106 using the cellular radio technology of the mobile host device 110d. If an account activation is not included, then execution proceeds to decisional step 908. If card activation is not included, then execution ends. If card activation is included, then execution proceeds to decisional step 910. If an activation code is not included, then at step 912, one or more preprogrammed questions are presented to the user using the GUI of the host device. Returning to the initial example, the transaction card 112 may identify locally stored questions and present the questions to the user using the GUI 111 of the mobile host device 110. At step 914, locally-stored answers to the programmed questions are identified. Returning to decisional step 910, if an activation code is included, then execution proceeds to decisional step 916. If the activation code is manually entered by the user, then at step 918, a request for the activation code is presented to the user through the GUI of the mobile host device. In the initial example, the transaction card 112 may present a request for an activation code such as a string of characters to the user through the GUI 111 of the mobile host device 110. If the activation code is not manually entered by the user, then at step 920, the transaction card wirelessly transmits a request for the activation code using the cellular radio technology of the host device. In the cellular example, the transaction card 112 may transmit a request to the financial institution using the cellular core network 202. In either case, the locally-stored activation code is identified at step 922. If the locally stored information matches the provided information at decisional step 924, then at step 926, the transaction card is activated. For example, the transaction card 112 may activate in response to at least a user entering a matching activation code through the GUI 111. If the provided information does not match the locally stored information, then execution ends.

Figure 10:
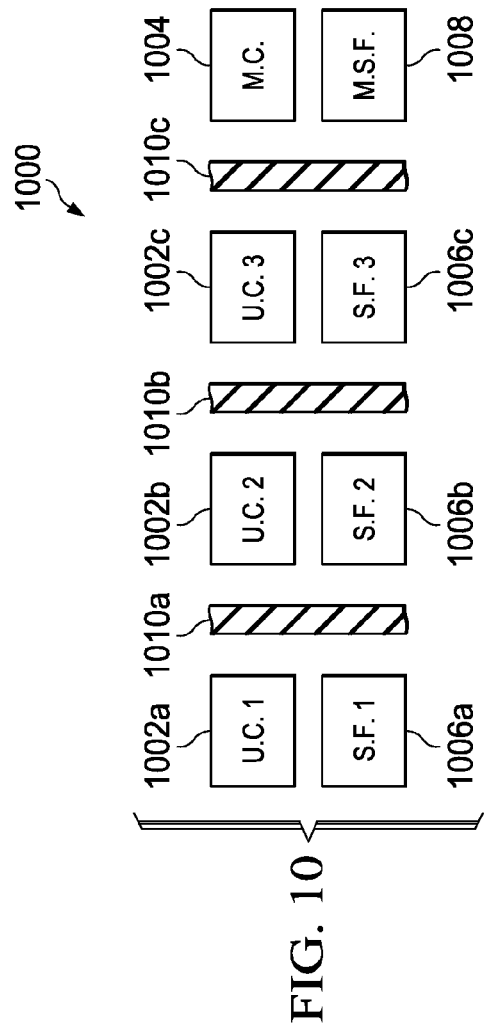
FIG. 10 illustrates an example memory for storing a plurality of user credentials in an intelligent card.

FIG. 10 illustrates example secure memory 1000 in accordance with some implementations of the present disclosure. In general, the secure memory 1000 is configured to store user credentials for a plurality of different financial institutions. For example, each credential may be associated with a different user account (e.g., credit card, bank account). In the illustrated implementation, the secure memory 1000 includes user credentials 1002a-c and associated security frameworks 1006a-c separated by logical barriers 1010-c. In addition, the secure memory 1000 includes master credentials 1004 and a master security framework 1008. Each user credentials 1002 may be associated with a different user account and/or institution. For each user credential 1002 is assigned or otherwise associated with a security framework 1006. The security framework 1006 may be a payment application executed by the intelligent card in response to at least a selection of a user account. For example, the security framework 1006 may execute transactions in accordance with a specified format, protocol, encryption, and/or other aspects of an authorization request. In some implementations, the security framework 1006 can substantially prevent unauthorized access to user credentials. For example, each security framework 1006 may contain multiple keys that provide different levels of access. Each application within the framework 1006 may then be configured to be accessible according to particular security levels. In some implementations, the security frameworks 1006 may include different versions of a payment application for a type of financial instrument (e.g., Visa). In some implementations, the security framework 1006 may be identified using an application ID.

The master credential 1004 and the master security framework 1008 may enable financial institutions to store or update user credentials 1002 and associated security frameworks 1006. For example, creation of a new key within a security framework 1006 may be protected by the master framework's root key. The barriers 1010 may generate security domains between the different selectable user credentials 502 and associated security framework 1006. For example, a financial institution may access user credentials 1002 and associated security framework 1006 for a managed user account but may be substantially prevented from accessing user credentials 1002 and associated security framework 1006 for different financial institutions.

In some implementations, the intelligent card (e.g., transaction card 112) can dynamically switch between user credentials 1002 and security frameworks 1006 in response to at least an event. For example, the intelligent card may switch to default user credentials 1002 and the corresponding security framework 1006 upon completion of a transaction. In some implementations, the intelligent card may switch user credentials 1002 and security frameworks 1006 in response to a selection from a user through, for example, the GUI 111 of FIG. 1. The intelligent card may typically switch between different user accounts based, at least in part, on different circumstances. In regards to adding additional user accounts, a user may manually enter user credentials 1002 using the GUI of a host device. In some implementations, the memory 1000 may be updated OTA using the cellular radio technology of the host device.

Figure 11:
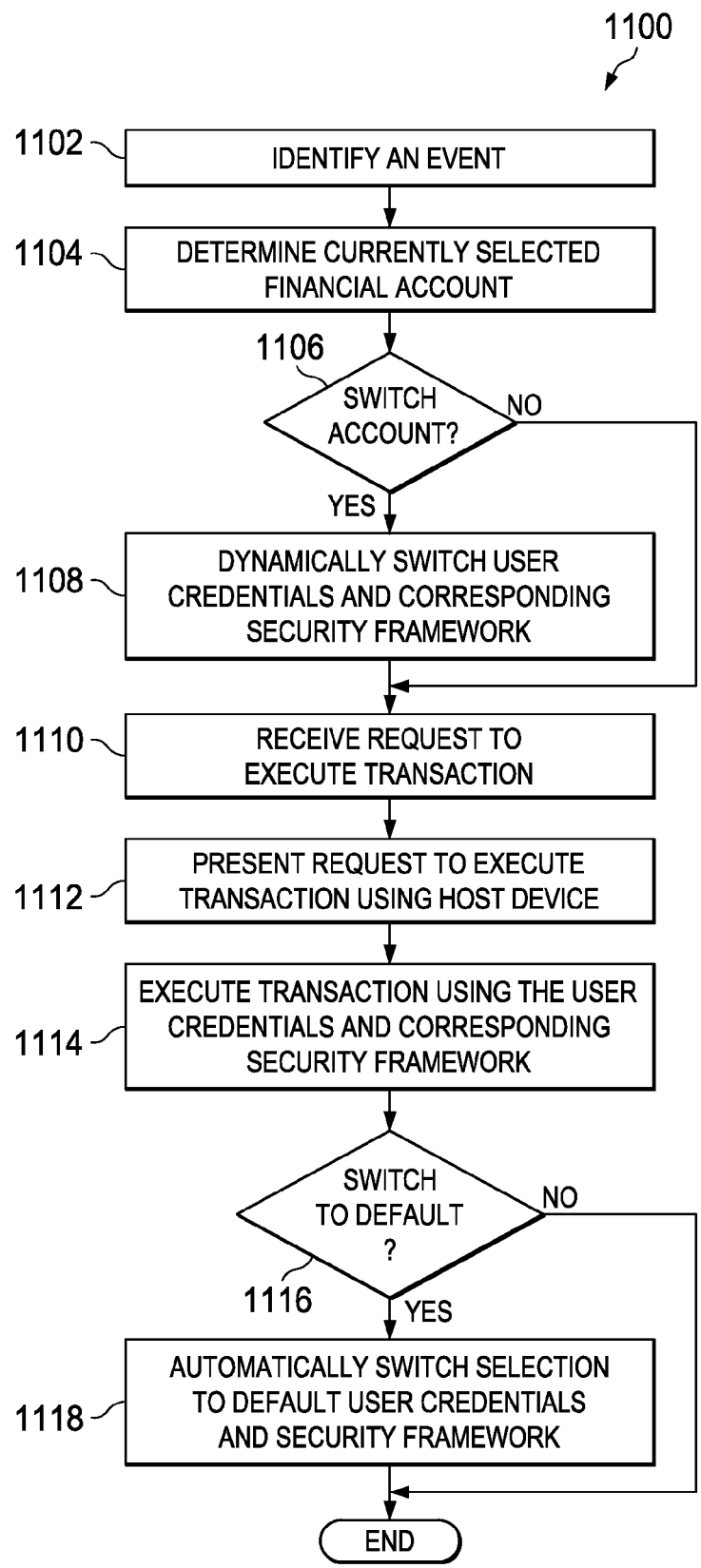
FIG. 11 is a flow chart illustrating an example method for dynamically switching between user accounts.

FIG. 11 is a flow chart illustrating an example method 1100 for dynamically switching between user accounts. In general, an intelligent card may dynamically switch between a plurality of selectable user credentials and associated security frameworks in response to at least an event. Many of the steps in this flowchart may take place simultaneously and/or in different orders as shown. System 100 or system 200 may use methods with additional steps, fewer steps, and/or different steps, so long as the methods remain appropriate.

The method 1100 begins at step 1102 where an event is identified. For example, the transaction card 112 of FIG. 1 may determine that one or more of the following has been updated: network ID, phone number, MAC address, and/or other information. In some implementations, the event may include identifying one or more aspects of a transaction or potential transaction. For example, the transaction card 112 may determine an enterprise, type of enterprise, goods and/or services, types of goods and/or services, and/or other aspects. At step 1104, the currently selected user account is determined. In the example, the transaction card 112 may determine the currently selected user credentials and security framework. If the user accounts are switched at decisional step 1106, then at step 1108, the intelligent card dynamically switches the currently selected user account to a different user account based, at least in part, on the identified event. Again in the example, the transaction card 112 may dynamically switch between the plurality of selectable user accounts based, at least in part, on one or more events. Next, at step 1110, a request to execute is received. As for the example, the transaction card 112 may directly receive a wireless request to execute a transaction with the access point 114. In response to at least the request, a request to execute the transaction is presented to the user at step 1112. In the example, the transaction card 112 may present the request to the user through the GUI 111 of the mobile host device 110. In some implementations, the transaction card 112 may present the currently selected user account to user through the GUI 111. At step 1114, the request transaction is executed using the selected user credentials and corresponding security framework in response to at least a selection from the user. Again in the example, the transaction card 112 may execute the request transaction in response to at least a user selecting a graphical element in the GUI 111 of the mobile host device 110 and wirelessly transmit the authorization request directly o the access point 114. If the selection of account is switched to a default account at decisional step 1116, the intelligent card automatically switches the selected user account to default user credentials and corresponding security framework. If the selection is not switched to a default account, then execution ends.

A number of embodiments of the invention have been described. Nevertheless, it will be understood that various modifications may be made without departing from the spirit and scope of the invention. Accordingly, other embodiments are within the scope of the following claims.

What is claimed is:
1. An insertable device, comprising:
an electrical interface that interfaces a mobile device including a Graphical User Interface (GUI) in connection with inserting the insertable device in a port of the mobile device;

secure memory that stores selectable user credentials used to execute transactions with contactless devices and are associated with one or more enterprises, each of the selectable user credentials are configured to execute transactions with the contactless devices, the secure memory includes master credentials and a master security framework that enable enterprises to store or update user credentials and associated security frameworks;

a user-interface module that dynamically generates displays associated with the user credentials and presents the dynamically-generated displays through the GUI of the mobile device, the dynamically generated display includes a display presenting the selectable user credentials in response to a contactless device requesting a wireless transaction;

a communication module that transmits, through the electrical interface of the insertable device, commands to the mobile device configured to execute communication with a financial institution through a cellular core network using cellular radio technology of the mobile device, wherein the cellular core technology of the mobile device is configured to wirelessly communicate with the cellular core network;

an antenna module that selectively switches an RF antenna of the insertable device between an activate state and an inactivate state in response to at least an event; and a transaction module that executes the wireless transaction with the contactless device using the selectable user credentials selected through the display presented through the GUI of the mobile device.

2. The insertable device of claim 1, wherein the electrical interface comprises at least one of a SecureDigital (SD) interface, a miniSD interface, a microSD interface, a MMC interface, a miniMMC, a microMMC, a firewire or an iDock interface, or a Universal Serial Bus (USB) interface.

3. The insertable device of claim 1, wherein the memory stores a plurality of security frameworks for the user credentials, the transaction module executes requested transactions using security frameworks from the plurality of security frameworks.

4. The insertable device of claim 1, wherein the wireless transactions are executed in response to at least user selections through the dynamically-generated displays.

5. The insertable device of claim 1, wherein the dynamically-generated displays present information based, at least in part, on at least one of real-time content during transactions, locally-stored offline content, or online content retrieved from the one or more enterprises.

6. The insertable device of claim 1, wherein the user-interface module further presents a request for user identification including at least one of a Personal Identification Number (PIN), user ID and password, or biometric signature through the GUI of the mobile device, the transaction module further verifies the submitted user identification with user identification locally stored in the secure memory prior to executing requested transactions.

7. The insertable device of claim 1, wherein the wireless transactions include signals comprising at least one of contactless signals, proximity signals, Near Field Communication (NFC) signals, Bluetooth signals, Ultra-wideband (UWB) signals, or Radio Frequency Identifier (RFID) signals.

8. The insertable device of claim 1, wherein the insertable device communicates with a card solely using SD signals.

9. The insertable device of claim 1, further comprising a cryptographic module that decrypts received signals prior to processing by the transaction module and encrypts at least part of the transaction response prior to wireless transmission.

10. The insertable device of claim 1, further comprising an authentication module that authenticates at least one of a network of the mobile device or the mobile device.

11. The insertable device of claim 1, further comprising a bootstrap module that executes one or more authentication processes in response to at least the electrical interface connecting with the mobile device.

12. The insertable device of claim 11, wherein the one or more authentication processes authenticates at least one of a network or a mobile host device.

13. The insertable device of claim 1, further comprising an activation module that activates access, by the transaction module, to user credentials and transmits, using the mobile device, to an associated financial institution a request to activate an associated user account.

14. The insertable device of claim 13, wherein access to user credentials is activated based, at least in part, on a user manually entering an activation code using the GUI of the mobile device.

15. The insertable device of claim 1, wherein the user of the mobile device manages different user accounts associated with the user credentials using the GUI.

16. The insertable device of claim 1, further comprising a credentials module further configured to receive requests to update the user credentials through a wireless connection with a cellular core network or a wired connection with a broadband network.

17. The insertable device of claim 16, the credentials module further configured to at least add new sets of user credentials or delete existing user credentials based, at least in part, on the update requests.

18. The insertable device of claim 1, wherein the user credentials include a default user credentials, the transaction module further configured to use the default user credentials after at least completing a requested transaction using different user credentials or expiration of a period of time to complete a transaction using non-default user credentials.

19. The insertable device of claim 1, wherein user credentials are loaded into the secure memory from a plurality of different enterprises.

20. The insertable device of claim 1, wherein the insertable device comprises a microSD card.

21. A method, comprising:
interfacing a mobile device including a GUI with an insertable device;
securely storing selectable user credentials used to execute transactions with contactless devices and are associated with one or more enterprises, each of the selectable user credentials are configured to execute transactions with contactless devices, the secure memory includes master credentials and a master security framework that enable enterprises to store or update user credentials and associated security frameworks;
transmitting, through an electrical interface of the insertable device, commands to the mobile device configured to execute communication with a financial institution through a cellular core network using cellular radio technology of the mobile device, wherein the cellular core technology of the mobile device is configured to wirelessly communicate with the cellular core network;
dynamically generating displays associated with the selectable user credentials and presents the dynamically-generated displays through the GUI of the mobile device, the dynamically generated display includes a display presenting the selectable user credentials in response to a contactless device requesting a wireless transaction;

selectively switching an RF antenna of the insertable device between an activate state and an inactivate state in response to at least an event; and executing the wireless transaction with the contactless device using the selectable user credentials selected through the display presented through the GUI of the mobile device.

22. The method of claim 21, wherein the mobile device is interfaced through at least one of an SD interface, a miniSD interface, a microSD interface, a MMC interface, a miniMMC, a microMMC, a firewire interface, an iDock interface, or a USB interface.

23. The method of claim 21, wherein the requested transaction is executed independent of the mobile device.

24. The method of claim 21, further storing a plurality of security frameworks for the user credentials, the transaction is executed using a security framework from the plurality of security frameworks corresponding to selected user credentials.

25. A microSD card, comprising:

an SD interface that connects to a mobile device including a GUI, wherein the SD interface communicates with the mobile device solely using SD signals;

an antenna module that selectively switches an RF antenna of the microSD card between an activate state and an inactivate state in response to at least an event secure memory that stores selectable user credentials used to execute transactions with contactless devices and are associated with one or more enterprises, each of the selectable user credentials are configured to execute transactions with the contactless devices, the secure memory includes master credentials and a master security framework that enable enterprises to store or update user credentials and associated security frameworks;

a communication module configured to transmit, through the SD interface of the microSD card, commands to the mobile device configured to execute communication with a financial institution through a cellular core network using cellular radio technology of the mobile device, wherein the cellular core technology of the mobile device is configured to wirelessly communicate with the cellular core network;

a user-interface module that dynamically generates displays associated with the selectable user credentials and presents the dynamically-generated displays through the GUI of the mobile device, wherein the dynamically-generated displays present information based, at least in part, on at least one of real-time content during transactions, locally-stored offline content, or online content retrieved from the one or more enterprises, the dynamically generated display includes a display presenting the selectable user credentials in response to a contactless device requesting a wireless transaction; and a transaction module that executes the wireless transaction with the contactless device using the selectable user credentials selected through the display presented through the GUI of the mobile device.

* * * * *